Figure 4A:
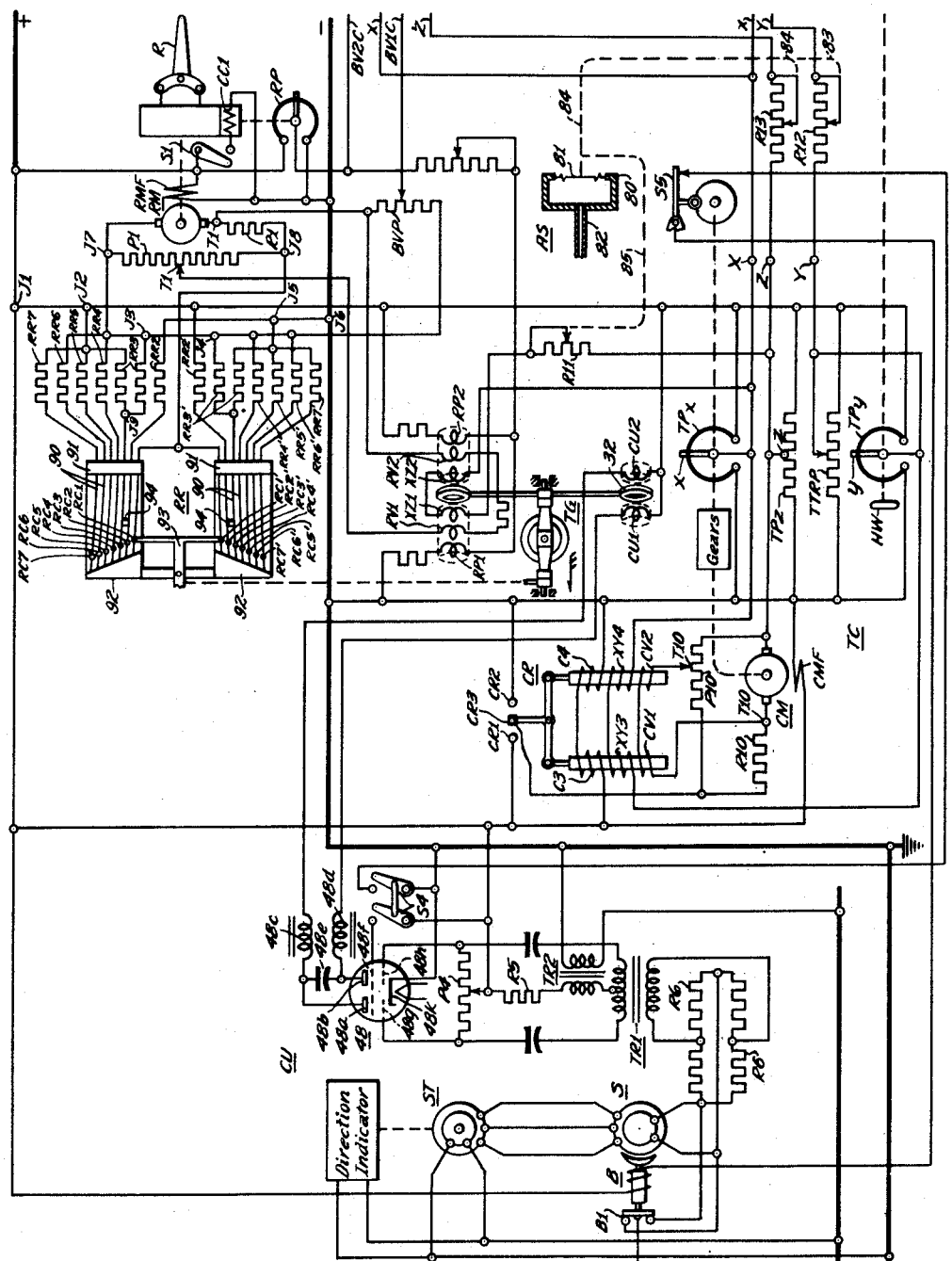

Oct. 20, 1953     C. R. HANNA ET AL     2,656,134
CONTROL SYSTEM FOR DIRIGIBLE CRAFT
Filed Nov. 14, 1947     4 Sheets-Sheet 1
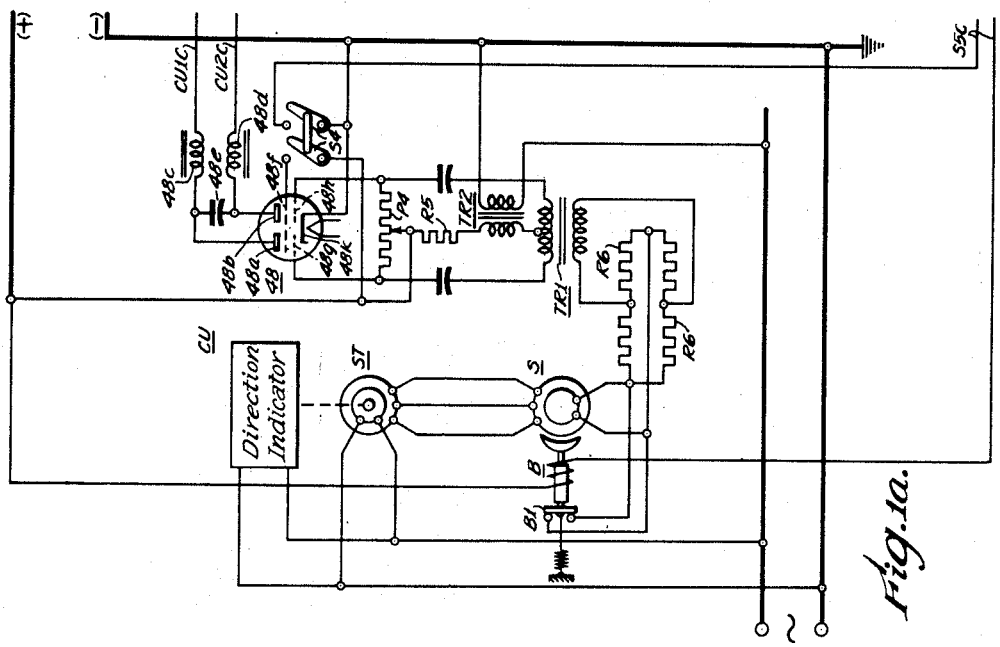
WITNESSES:
Robert C. Baird
E. H. Oberheim
INVENTORS
Clinton R. Hanna and
Kirk A. Oplinger.
BY Paul E. Friedemann
ATTORNEY

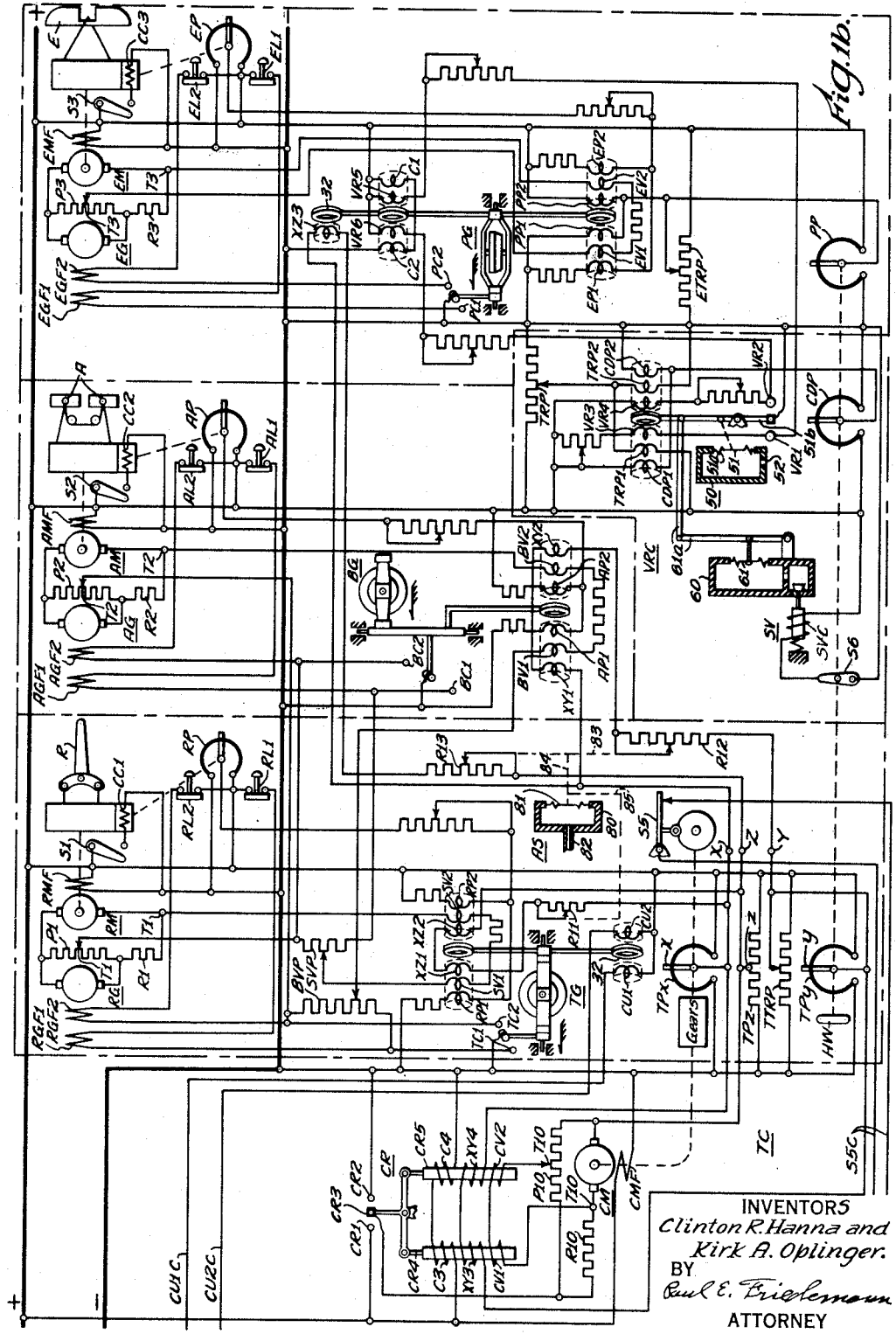

INVENTORS
Clinton R. Hanna and
Kirk A. Oplinger.
BY
Paul E. Friedmann
ATTORNEY

Patented Oct. 20, 1953

2,656,134

UNITED STATES PATENT OFFICE 2,656,134

CONTROL SYSTEM FOR DIRIGIBLE CRAFT

Clinton R. Hanna, Pittsburgh, and Kirk A. Oplinger, Verona, Pa., assignors to Westinghouse Electric Corporation, East Pittsburgh, Pa., a corporation of Pennsylvania Application November 14, 1947, Serial No. 785,985

63 Claims. (Cl. 244—77)

This invention relates generally to systems of control and, more particularly, to control systems applicable in the control of conveyances operable in space.

The invention is herein illustrated and described as applied in the control of a conventional aircraft utiliizng rudders, elevators, and ailerons, respectively, for controlling the craft directionally, longitudinally and laterally. However, it will be appreciated that the invention may be applied to other types of craft utilizing means other than the control surfaces mentioned for effecting maneuverability.

In certain of its aspects, this invention relates to a copending application of C. R. Hanna, Serial No. 785,983, filed November 11, 1947, entitled Control Systems and assigned to the same assignee as this invention.

In still other of its aspects, this invention is related to a copending application of I. M. Holliday, G. R. Douglas and C. R. Hanna, Serial No. 785,984, filed November 14, 1947, entitled Control Systems and assigned to the same assignee as this invention.

In order that the present invention may be fully appreciated, it is essential that the fundamental principles of flight control be understood.

The control of an aircraft may be resolved about three mutually perpendicular axes. One is a vertical axis termed the turn axis about which yawing or turning movement of the craft takes place, such movement being effected by the application of left or right rudder for a turn to the left or to the right. A second axis disposed longitudinally of the craft and perpendicular to the said vertical axis is termed the roll axis, about which the aircraft rotates. Movement about the roll axis is controlled by the ailerons which are simultaneously operated in opposite directions, that is, one moves up as the other moves down, to produce cumulative torques about the roll axis for banking the craft. The third axis passes laterally of the craft perpendicular to the aforenamed axes at the point of intersection thereof and is termed the pitch axis of the craft. Control of the craft about the pitch axis for a drive, a climb or for level flight is afforded by the elevators which tilt the craft longitudinally about the pitch axis to change the angle of attack of the wing airfoil and as a consequence the direction of flight of the craft in a vertical plane.

In still air when the aircraft is oriented so that its roll and pitch axes are horizontal, it will tend to follow a course which is the projection of the longitudinal axis or roll axis. But whenever the craft is rotated about one or more of the three control axes, either by the application of one or more of its control surfaces or by air disturbances, the flight path as a rule changes.

It is important to note, and this is particularly true of the ailerons, that the position of the control surfaces does not determine the position of the aircraft about any of the control axes, but rather determines the velocity of movement about the corresponding axis. Thus in maneuvering the craft it is necessary to perform double operations in the application of the control surfaces. In a simple turn, for instance, first the application of the control surfaces is made in a direction to cause the craft to assume the desired attitude in flight after which the ailerons are usually returned to a neutral or streamlined position and the rudder and elevators streamlined to a lesser extent. A return to level flight is then effected by a reverse movement of the ailerons and movement of the rudder and elevators to their neutral positions.

To properly execute a turn in an aircraft, it is essential that movement of the control surfaces be coordinated. Too much rudder will cause the craft to skid outwardly in a turn, too much aileron will cause side slipping, while insufficient application or over-application of the elevators during a turn will tend to cause, respectively, diving and to a lesser degree climbing.

In addition to the above-described proportioning of control surface movement which must be effected, there is also the consideration of suitable time delays in the application or removal of rudder and elevators in the execution of simple turns. The ability of an aircraft to be turned by simple application of the rudder depends in some measure upon the aerodynamics thereof. An inherently stable craft upon the application of rudder and the skidding movement which follows will tend to accumulate the bank angle necessary for equilibrium in the indicated turn. However, in any case a turn may not be executed satisfactorily in the absence of a bank angle. Thus for a coordinated turn, it will be appreciated that the application of the rudder should be proportional to the angle of bank and should follow as the bank angle for the desired turn is accumulated. A suitable co-ordination of movement of the ailerons and rudder, therefore, effects an application of the ailerons to produce the desired velocity of rolling movement about the roll axis to the desired angle of bank and the application of the rudder to produce the necessary turn velocities indicated by the instantaneous angles of bank.

The considerations involved in the control of the elevators are analogous to those for the control of the rudder. Premature application of the elevators when entering a turn will cause the aircraft to climb, while premature removal thereof coming out of a turn will cause the aircraft to dive. The application of up elevator for a turn in either direction may be viewed as compensating for the reduction in horizontal lifting surface of the wing for a given angle of bank, by increasing the angle of attack of the airfoil to increase the lift. Thus, as in the case of the rudder, the angle of bank indicates the pitch velocity of the aircraft in a turn and coordination of control requires that the elevators be applied and removed as the angle of bank is increased or decreased.

The time delay in acquiring a given bank angle depends upon the characteristics of the particular aircraft, for instance, the aerodynamic properties and the mass. In general, the larger the craft, the longer will be the time delay. Additionally, in a given craft, this delay will vary depending upon the degree of application of the ailerons which determines the roll velocity and, for a given aileron deflection the roll velocity will vary as a function of the air speed.

On object of this invention is to provide a control for a body operable in space which is simple with respect to operational requirements and positive in operation.

An additional object of this invention is to provide a control for a body operable in space which is light in weight and compact in design.

Another object of this invention is to provide a control for a craft operable in space affording coordinated control of the craft about the control axes thereof.

More specifically stated, it is an object of the present invention to provide a system of control for an aircraft affording an application of the control means thereof used in effecting maneuvers in such a way as to maintain the aircraft in equilibrium in various flight attitudes.

The foregoing statements are illustrative of the various aims and objects of this invention. Other objects and advantages will become apparent from a study of the following specification when considered in conjunction with the accompanying drawings, in which:

Figures 1a and 1b together, schematically illustrate a control for an aircraft embodying the fundamental principles of this invention;

Fig. 2 is a schematic illustration of a variation of a portion of Fig. 1.

Fig. 3 schematically illustrates an alternative of the structure of Fig. 2; and

Figure 4B:
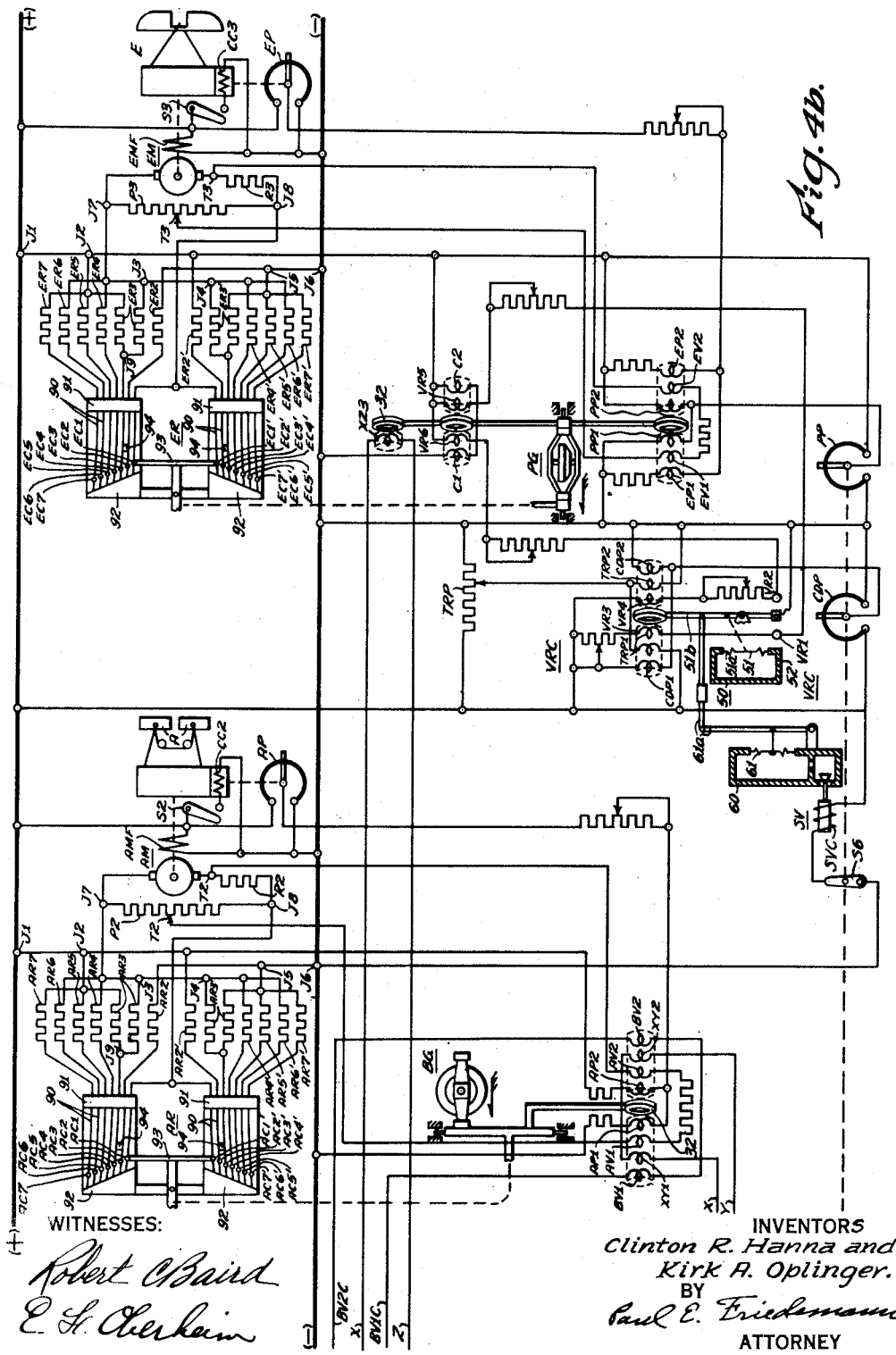

Figs. 4a and 4b, together, schematically illustrate a control for an aircraft embodying a variation in the servo-systems illustrated in Figs. 1a and 1b according to the principles of this invention.

An important function of an aircraft flight control system or automatic pilot is to fly the aircraft straight and level at a given altitude. To this end, the control must be quick to sense minor departures of the craft from fixed reference positions or to sense velocities about any of the three control axes to maintain a predetermined mode of operation. Additionally, it is desirable that the control in response to stimuli of a piloting means manipulatable by the human pilot shall afford a coordination of control surface movement causing the craft to execute the maneuver indicated by the piloting means while maintaining the craft in equilibrium throughout the maneuver.

Control systems accomplishing this end usually include gyroscopes to detect errors in position of the craft. Such gyroscopes as a rule have been of the position type, that is, gyroscopes disposed on the craft to detect changes in flight attitude and to produce signals which, when applied to suitable servo-systems operating the control surfaces, tend to restore the aircraft to the desired flight altitude. Gyroscopes of this type however by reason of their mounting have a limited degree of freedom and, therefore, limit the maneuverability of the craft. If the maneuverability limit is exceeded, the spin axis of the gyroscope is rotated with the craft about a given axis, angularly deflecting the plane of the gyroscope rotor and the resulting precessional response results in "tumbling" of the affected gyroscope or gyroscopes rendering the control useless.

A better control is obtainable by the use of restrained velocity type gyroscopes which respond to the velocity of motion of the craft about the control axes thereof. Each produces an output torque proportional to the input velocity. Therefore, the output torque is usable in a control of the craft to check velocity errors about any of the control axes. Additionally, by the introduction of suitable biasing means to the gyroscopes, a controlled output thereof may be initiated to effect a control of the craft in the execution of certain maneuvers.

There are several advantages inherent in the provision of such a control. Importantly among these is the fact that a control may be provided which is responsive to the output torque of the gyroscope requiring negligible gyroscope output motion for operation. Hence the motion of the gyroscope about the output axis thereof may be limited. Since the input axis of such a gyroscope is constituted in a control axis of the aircraft, that is, the gyroscope is secured to the craft to respond to velocities or rates of motion about a given control axis, the limitation of output motion results in a restrained mounting thereof preventing the gyroscope from tumbling irrespective of the flight attitude of the aircraft. Thus, with a system of neutral rate gyroscopes, that is, gyroscopes which are balanced about the output axis thereof, any type of maneuver may be executed by the application of a suitable biasing control to the gyroscopes, there being no maneuverability limit to the gyroscopes.

Another important advantage resulting from the control afforded by the velocity type gyroscopes is that a fast response to errors is had. Since a rate of motion must occur before an actual displacement may occur about any of the control axes, it is possible to produce a suitable force or torque on the craft tending to oppose that producing the velocity error or disturbance without waiting for an actual displacement to occur. By suitably proportioning the control resulting from the velocity sense of the gyroscopes, it is possible to provide a control in which the actual excursions in position are of a minor nature and noticeable position errors may accumulate only over relatively long periods of time. Such errors may be corrected upon periodic checking of course and altitude by the human pilot.

However, adequate control in some cases may require that a system of control as herein disclosed be capable of correcting position errors. Hence, means are herein provided for imparting directivity to each of the velocity type gyroscopes employed.

The system illustrated in the drawing embodies the velocity or rate gyroscopes mentioned above. First, a turn rate gyroscope TG controls a servo-system, including the rudder generator RG and the rudder motor RM which is connected to drive the rudder R of the aircraft through a system of gears; second, a bank or roll rate gyroscope controls a servo-system including the aileron generator AG and aileron motor AM which drives the ailerons A; and the third, a pitch rate gyroscope PG controls a servo-system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in elevation.

A detailed discussion of the gyroscopes is given in the above-identified copending application of C. R. Hanna, Serial No. 785,983, only such details being hereinafter presented as are deemed essential to an understanding of this invention.

As illustrated, each gyroscope has freedom for gyroscopic response about a single axis, otherwise the gyroscope is secured to the aircraft. Thus it will be observed that the turn gyroscope TG is sensitive only to angular motion about the turn axis of the aircraft, the turn axis lying in the plane of the drawing and being perpendicular to the axis about which the turn gyroscope is pivoted, which axis constitutes the output or precession axis of the turn gyroscope. The pitch gyroscope PG is similarly disposed, its output or precession axis being perpendicular to the pitch axis of the aircraft which is a line perpendicular to the plane of the drawings. The same applies to the bank gyroscope BG having its axis of freedom disposed at a right angle to the roll or bank axis of the aircraft which is a horizontal line in the plane of the drawing. In each case, it will be observed that a rate of motion of the aircraft about any one of the turn, roll or pitch axes, applies a torque to the corresponding gyroscope tending to angularly displace the spin axis thereof. Accordingly, each gyroscope, having a degree of angular freedom about an output axis at right angles to the axis of the applied torque, produces an output torque representative of the input velocity, and the output torque is herein utilized to produce suitable control quantities for operating the associated servo-system.

There are several ways in which the gyroscope output torques may be utilized to produce electrical quantities. For instance, the torque may be applied through a mechanical linkage to a carbon pile unit or other type of variable resistance unit to control the resistance thereof. The present embodiment of Figs. 1a and 1b utilizes a contact set comprising a pair of opposed stationary contacts having a movable contact secured to the gyroscope radially of the output axis thereof, disposed therebetween. Thus, in the case of the turn gyroscope, for instance, precessional motion selectively engages the movable contact with either of contacts TC1 or TC2 which are, respectively, connected in series with one of a pair of differentially related field windings RGF1 and RGF2 of the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (−). Similarly, the circuit for field RGF2 extends from the positive conductor (+) through limit switch RL2 actuated by the rudder potentiometer RP, through field RGF2 to contact TC2 and thence to the movable contact and the negative conductor (−). The bank and pitch gyroscope contact circuits are the same as that of the turn gyroscope, aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly elevator generator field EGF1 is connected in series with limit switch EL1 actuated by elevator potentiometer EP and the pitch contact set PC1 and field EGF2 is in series with limit switch EL2 and pitch contact set PC2, both series circuits being connected across the power supply.

The function of the gyroscope contacts in controlling the excitation of the field circuits of the generators is not simply that of making and breaking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means, average currents are caused to flow in the field circuits corresponding to the detected error velocity about the corresponding control axis of the aircraft or corresponding to a set in turn rate at the handwheel HW.

The mentioned electromagnetic biases are produced by sets of electromagnets having armatures secured to the respective gyroscopes radially of their output axes. The specific structure of the electromagnets is not illustrated but reference may be had to the mentioned application of C. R. Hanna for these details. Generally, the electromagnets are designed with overlapping core and armatures so that appreciable changes in air gaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet system shown in the drawings, the cores are disposed in opposed relation and an annulus 32 of magnetic material secured to the associated gyroscope as previously described surrounds the core structures at the air gap formed between the confronting extremities of the cores. The axial length of the armature is sufficient that overlapping of the cores thereby exists throughout the limited range of armature motion.

The electromagnetic biases are produced by feed back voltages and control voltages applied to the respective coils of the magnets. The precessional response of each gyroscope is damped by a feed back voltage representative of the velocity of operation of the motor of the corresponding servo-system. To this end, each motor is connected as one leg in a bridge circuit which is balanced against the resistance of the motor armature winding when the motor is not rotating. Thus when the motors drive the corresponding control surfaces to equilibrium position and stop, the current circulating in the bridge circuits are balanced and the output voltage of each bridge is zero. However, during rotation, the back electromotive force of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply, the back electromotive force varies essentially in magnitude and direction with the motor speed and direction of rotation producing a velocity voltage across the output terminals of each bridge circuit.

The bridge circuit for the rudder motor includes a potentiometer P1 of which the tapped portions form adjacent legs and the remaining adjacent legs are formed by the resistor R1 and the armature winding of the rudder motor. Generator RG is connected across potentiometer P1, the extremities of which form the bridge circuit input terminals while terminals T1 formed by the tap of potentiometer P1 and the point between resistor R1 and the motor armature winding constitute the output terminals. The armature winding of aileron motor AM likewise forms one leg of a bridge circuit energized by generator AG and including a potentiometer P2 and a resistor R2, the ouput terminals being designated T2. Similarly, the armature winding of the elevator motor EM forms one leg of the bridge including potentiometer P3 and resistor R3 which is energized by generator EG and has for its output terminals the terminals T3. In each instance, the velocity voltage taken from the respective bridge circuits is fed back in a negative sense, that is, the electromagnetic bias resulting from the velocity feed back voltage opposes the processional response of the corresponding gyroscope.

A second feedback voltage is taken from the potentiometers RP, AP and EP, the movable taps of which are driven by the corresponding servosystems through electromagnetically operated clutches having coils CC1, CC2 and CC3 which are respectively energized from the power supply upon closure of switches S1, S2 and S3. Since the potentiometers are each actuated by a motor driving a control surface of the aircraft, the position of each movable tap and hence the tapped voltage corresponds to the position of the associated control surface. Thus the response of each gyroscope is also controlled in dependence of the motor rotational position or the control surface position.

In order to obtain co-ordination of control surface movement during the execution of turns, the turn and bank gyroscopes TG and BG are additionally biased by voltage taken, respectively, from a skid voltage potentiometer SVP and a bank voltage potentiometer BVP, which are, respectively, connected in the field circuits of the aileron and rudder generators to be energized in dependence of the currents circulating therein when a set of the associated gyroscope contacts is closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive conductor (+) and including limit switch AL2, generator field AGF2, potentiometer SVP, contact BC1 and the movable contact engaged therewith to the negative conductor (—). Engagement of the movable contact with contact BC2 energizes the potentiometer SVP in a reverse direction in a circuit including the generator field AGF1 and limit switch AL1. Analogous considerations apply to the bank voltage potentiometer BVP. Thus, upon the operation of either of the bank or turn gyroscopes to control the associated control surface, the other gyroscope is biased in a direction to effect a co-ordinated application of its control surface.

The turn, bank and pitch gyroscopes are additionally biased by voltages obtained from potentiometers of a transient coordinator TC controlled by handwheel HW under the control of the human pilot. These potentiometers are designated $TPx$, $TPy$ and $TPz$, of which $TPy$ is actuated by the human pilot, $TPx$ is driven by a follow-up motor control responsive to the differential voltage across the taps of potentiometers $TPy$ and $TPx$ and potentiometer $TPz$ is provided with a fixed tap. The details of this potentiometer system will be hereinafter considered. But at this point it is sufficient to note the function thereof. To execute a turn, the pilot actuates the handwheel HW in rotation displacing the tap $y$ along potentiometer $TPy$. The voltage between the tap $y$ and the tap $x$ of potentiometer $TPx$ causes operation of the control motor CM of the transient coordinator driving movable tap $x$ in a direction to match the tap voltage at $x$ with that at $y$ tending to reduce the difference of the tap voltages to zero at a preselected rate. All three potentiometers are so aligned for straight away flight that the tap voltages $y$ to $x$ and $x$ to $z$ are zero. Hence, motion of tap $x$ to balance or match the tap voltage at $y$ produces a voltage $x$ to $z$ which increases at the rate at which the $y$ to $x$ voltage is decreased. Both the $y$ to $x$ and $x$ to $z$ voltages, it will be observed, reverse polarity depending upon the direction of rotation of handwheel HW from neutral position. Voltage $y$ to $x$ which is the first to occur is used to bias the bank gyroscope BG and voltage $x$ to $z$ which builds up substantially as the voltage $y$ to $x$ decreases, is applied to the turn and pitch gyroscopes. The biasing systems of the turn and bank gyroscopes are polarity sensitive and, hence, bias the associated gyroscopes one direction or the reverse depending upon the polarity of the biasing voltages. On the other hand, the section of the biasing system for the pitch gyroscope receiving the voltage $x$ to $z$ is not polarity sensitive and is arranged in its response to produce up-elevator for both polarities of voltage $x$ to $z$.

Additionally, it has been found that the pitch velocity in a turn varies substantially as the square of the angle of bank within a range of bank angles approaching 45° in either direction from the horizontal. Since the position of the elevators controls the pitch velocity, suitable up-elevator control requires that the elevators be applied approximately in accordance with the mentioned square law relation of bank angle and pitch velocity. In the instant case, this is accomplished by providing linear response biasing systems for the turn and bank gyroscopes and a square law response biasing section in the pitch gyroscope biasing system to produce the needed up elevator for the indicated turn.

Considering now the control sequence of the transient coordinator TC which occurs upon rotation of the handwheel HW, first the voltage $y$ to $x$ is produced which effects a directed bias of the bank rate gyroscope depending upon the direction of handwheel rotation producing roll in the proper direction at a rate corresponding to the magnitude of the applied voltage. Thus the accumulation of bank angle is initiated. As the follow-up control of potentiometer TP$x$ functions, the voltage $y$ to $x$ decreases and voltage $x$ to $z$ appears and increases substantially at the rate or any suitable function of the rate of decrease of voltage $y$ to $x$. Reduction of voltage $y$ to $x$ decreases the bias of the bank gyroscope returning the ailerons to streamlined position as the proper angle of bank for the indicated turn rate is approached while the increasing voltage $x$ to $z$ controls the turn and pitch rate gyroscope to apply the rudder and elevators in time phase with the bank angle to continuously match the turn and pitch velocity with the instantaneous angles of bank.

The pitch gyroscope is also biased by a voltage taken from the pitch potentiometer PP. This potentiometer is actuated by push-pull motion of the handwheel affording reversed polarity biasing voltages when the movable tap is moved to opposite sides of neutral position, dives and climbs being executed by push-pull motion of the handwheel.

Directivity is imparted to all three gyroscopes. In the case of the bank gyro, this is accomplished by making the gyroscope pendulous about its vertical output axis as illustrated. Thus this gyroscope in addition to responding to rates of motion about the roll axis is also sensitive to lateral acceleration and gravity, tending to assume a position about the vertical output axis thereof corresponding to the resultant of these two quantities. As a consequence, the reference position for which this gyroscope initiates rolling motion of the craft corresponds to the proper angle of bank for the actual turn velocity of the craft.

In the case of the pitch gyroscope directivity is obtained from the vertical rate control VRC which produces biasing voltages in dependence of the rate of change of altitude and/or actual displacements in altitude. The vertical rate control includes a structure 50 having an opening therein forming a chamber which is sealed by a diaphragm 51 supported by a flexible annulus 51a. A small orifice 52 affords communication of the chamber with the atmosphere and diaphragm 51 is therefore displaced to the left or right as viewed with a force depending upon the rate of movement of the assembly vertically in the atmosphere. Diaphragm 51 is connected with pivoted arm 51b carrying a movable contact at its lower extremity and an armature of an electromagnet assembly at its remaining extremity. The movable contact is disposed between a set of stationary contacts VR1 and VR2 which under influence of the biasing control of the electromagnet associated therewith are caused to hover during operation. The vertical position reference is provided by the structure including the chamber 60 sealed by diaphragm 61, the motion of which is transmitted to arm 51b by link system 61a and thus also influences contact operation.

The vertical rate control electromagnet assembly is energized by a dive and climb potentiometer CDP actuated by push-pull motion of handwheel HW. This potentiometer is connected in a bridge circuit with the pair of coils CDP1 and CDP2 in which the tapped portions of the potentiometer form one pair of adjacent legs and coils CDP1 and CDP2 form the remaining pair of adjacent legs. The bridge circuit is connected across the positive and negative conductors and the movable tap of the potentiometer CDP is connected between the coils. Thus motion of the potentiometer tap to either side of center position correspondingly unbalances the coil currents and the armature is biased accordingly to cause selective engagement of the movable contact with one or the other of contacts VR1 and VR2. Contacts VR1 and VR2 are respectively connected in series with coils VR3 and VR4 of the vertical rate electromagnet. The arrangement is such that closure of a contact energizes the corresponding coil tending to open the contact, producing a hovering contact motion in which the electromagnetic biases balance the mechanical biases on arm 51b. The remaining pair of coils TRP1 and TRP2 form adjacent legs of a bridge including the trim potentiometer TRP which is adjustable to compensate off center conditions. During periods of climbing and diving of the aircraft initiated at the handwheel switch S6 operated by push-pull handwheel motion, deenergizes solenoid valve SV which is spring biased open and provides communication of chamber 60 with the atmosphere.

In the case of the turn rate gyroscope TG directivity is obtained from the course control unit generally designated CU. Means for producing the fixed course signal voltages may be of any suitable form. One such means includes a gyrostabilized magnetic compass (not illustrated) embodied in the block entitled "Direction Indicator." This type of device includes a magnetic pickup commonly known as a flux valve. Briefly, such a compass includes three stationary magnetic members disposed in 120° relation in a horizontal plane so that their permeability is altered by the horizontal component of the earth's magnetic field. When the three members are energized by a single phase alternating current, there is produced in three secondary windings forming part of the magnetic members, a set of voltages having double the applied frequency and which are unbalanced in magnitude depending upon the direction of the earth's magnetic field. Such voltages correspond in every respect to single-phase synchro-transmitter voltages as the rotor of the synchro-transmitter is turned. The voltage pattern of the flux valve is applied to the stator of a single-phase synchro-control transformer the single-phase output of which is amplified and employed to bias the directional gyroscope which in the instant application is of the position type. The bias forces acting about the input axis of the directional gyroscope produce precession movement thereof which by suitable mechanical connection with the rotor of a second synchro-control transformer ST effects rotational movement thereof producing a strong output voltage pattern. This output voltage pattern is applied to the stator of a synchro-unit S connected in a suitable network whereby a control of the tube 48 is had.

Vacuum tube 48 is provided with a pair of plates connected with the positive side of the source, the circuit for plate 48a including choke coil 48c and coil CU1 and the circuit for plate 48b including choke coil 48d and coil CU2. Choke coils 48c and 48d together with the shunt connected capacitor 48e form a filter network for the plate circuit tending to provide vibrationless electromagnet control for the turn gyroscope. Suppressor grid 48f is connected to the positive side of the supply source through one blade of switch S4. Control grids 48g and 48h are connected to diagonally opposite terminals of a bridge network including a potentiometer P4 and the secondary winding of a transformer TR1 in such a way that the voltages thereof are varied in opposite directions depending upon the voltage across the secondary winding of transformers TR1. The cathode 48h is connected to the negative side of the source, completing the power circuit for the tube.

A circuit including the secondary winding of transformer TR2 and series resistor R5 is connected across the remaining two terminals of the bridge network formed by a tap on the secondary winding of transformer TR1 and the adjustable tap of potentiometer P4. A constant bias is applied to the control grid 48g and 48h by the connection of the tap of potentiometer P4 to the positive side of the source, the adjustment being such as to balance the plate currents of the tubes when the error signal is zero. A reference voltage having a frequency synchronized with the frequency of the voltage of the rotor winding of synchro-unit S is applied to the primary winding of transformer TR2 providing simultaneous variation of the grid voltages of both sections of the tube 48 in synchronism with the output of synchro-unit S.

The output side of the synchro-unit S is connected across a normally unbalanced resistance bridge network including a pair of resistors R6 in opposite legs. Resistors R6 are of equal ohmic value which is higher than the ohmic values of the resistors in the remaining two legs, unbalancing the bridge. Additionally, resistors R6 are of material in which the resistance decreases as the applied voltatge increases. Hence, as the applied voltage to the bridge is increased, the decreasing resistance of resistors R6 tends to decrease bridge unbalance. With this arrangement, it is possible to increase the sensitivity of the amplifier to small error voltages and since the bridge unbalance is reduced by large error voltages, the range of voltages applied to the amplifier is not excessive.

The instantaneous phase relation of the error signal to the reference voltages on the grid circuit of the tube 48 depends upon the direction of angular displacement of the aircraft with respect to the set course, and drives one grid more positive as the other is made less positive in a degree depending upon the extent of angular phase shift of the error signal with respect to the reference signal. This push-pull operation of tube 48 unbalances the voltages of the tubes producing the course error voltage.

Summing up the foregoing electromagnetic biases on the individual gyroscopes, the turn rate gyroscope electromagnet assembly is controlled by a rudder motor velocity voltage taken from the bridge circuit terminals T1, a rudder position voltage from rudder potentiometer RP, a skid voltage from the skid voltage potentiometer SVP, a piloting voltage ($x$ to $z$) from the system of turn potentiometers of the transient coordinator TC, and a course error voltage from the course control unit CU.

The bank rate gyroscope electromagnet assembly is controlled by an aileron motor velocity voltage from bridge circuit terminals T2, an aileron position voltage from aileron potentiometer AP, a bank voltage from bank voltage potentiometer BVP and a piloting voltage ($y$ to $x$) from the system of turn potentiometers of the transient coordinator.

The pitch rate gyroscope electromagnet assembly is controlled by an elevator motor velocity voltage taken from bridge circuit terminals T3, an elevator position voltage from elevator potentiometer EP, a piloting voltage ($x$ to $z$) from the system of turn potentiometers of the transient coordinator producing up-elevator, a piloting voltage from the pitch potentiometer PP for climbs and dives, and a combined vertical rate and vertical position voltage from the vertical rate control VRC.

These biasing voltages for the three gyroscopes are applied in any operating order and in varying magnitudes depending upon the control requirements of the specific operating condition and the circuit connections are as follows:

Considering the turn gyroscope electromagnet system, the velocity feedback voltage taken from terminals T1 and the skid voltage taken from skid voltage potentiometer SVP are added in series in a circuit extending from terminal T1 at the movable tap of potentiometer P1, through a portion of skid voltage potentiometer SVP to the tap thereof, through coils SV1 and SV2 respectively arranged on cores on opposite sides of the associated armature and terminating at the other terminal T1. Since coils SV1 and SV2 are on opposed cores with respect to the armature disposed therebetween opposed torques are produced about the turn rate gyroscope output axis. The rudder position feedback voltage is applied by the connection of the rudder potentiometer RP in a bridge circuit with coils RP1 and RP2, coil RP1 being on a core with coil SV1 and coil RP2 being on the core with coil SV2, so that movement of the tap of the rudder potentiometer unbalances the currents of coils RP1 and RP2 unbalancing the opposed torques resulting therefrom. The piloting voltage ($x$ to $z$) is applied across a pair of series connected coils XZ1 and XZ2 respectively disposed on oppositely disposed cores with coils RP1 and RP2 in a manner similar to coils SV1 and SV2. The course error voltage is applied to coils CU1 and CU2 over conductors CU1C and CU2C as previously described, arranged on a core assembly separate from that of coils RP1 and RP2 and the magnetic effects of the course control coils produce opposed and balanced torques about the turn rate gyroscope output axis when the craft is on course.

While the magnetic effects of coils SV1 and SV2 and likewise the magnetic effects of coils XZ1 and XZ2 produce opposed torques about the turn rate gyroscope output axis due to their mounting on opposed core structures, the M. M. F.'s of the coils on the same core are arranged to add or subtract depending upon the control condition. If, for instance, coils RP1 and RP2 are regarded as the polarizing coils producing a north pole on each core at the extremity adjacent the armature, then for one control condition the M. M. F.'s of coils SV1 and XZ1 may oppose that of coil RP1 reducing the total biasing flux on that side of the armature while on the other side of the armature the M. M. F.'s of coils SV2 and XZ2 will aid that of coil RP2 increasing the total biasing flux producing an unbalanced magnetic force acting in the direction of the core having the greater flux.

Also due to the biasing effect of coils RP1 and RP2 it will be appreciated that the response of the electromagnet system of the turn rate gyroscope is linear with respect to the energizing quantities for the several coils thereof and due to the fact that an armature assembly is employed in which overlapping gaps are provided the electromagnet system is relatively free of negative stiffness.

In the bank gyroscope electromagnet system, the velocity voltage and the bank voltage taken respectively from the pair of bridge circuit terminals T2 and the bank voltage potentiometer BVP are added in series in a circuit including a pair of coils BV1 and BV2 respectively disposed on opposite cores of the bank rate gyroscope electromagnet system. This circuit corresponds to its counter part including coils SV1 and SV2 in the rudder section of the system. The aileron position voltage is applied by the connection of the aileron potentiometer AP in a bridge circuit with coils AP1 and AP2 in which the movable tap on AP controls the currents of coils AP1 and AP2. The piloting voltage ($y$ to $x$) is applied across series connected coils XY1 and XY2 respectively disposed on opposite cores and this circuit is trimmed for off center conditions by potentiometer TTRP which parallels the potentiometer TP$y$. It is readily observed that this system of coils for the bank rate gyroscope electromagnet corresponds to that of the turn rate gyroscope electromagnet. The function thereof will be understood in connection with the description of the turn gyroscope electromagnet.

In the pitch gyroscope electromagnet system the velocity voltage is applied to coils EV1 and EV2 arranged on oppositely disposed cores and being connected in series across the bridge circuit terminals T3. The elevator position voltage is applied by means of a bridge circuit in which the tapped portions of potentiometer EP form adjacent legs and a pair of coils EP1 and EP2 form the remaining two adjacent legs, the movable tap of EP being connected between the coils EP1 and EP2 to control the current distribution between the coils. Here again the position coils EP1 and EP2 may be regarded as the polarizing coils producing north core poles adjacent the armature therefor. In one instance the M. M. F. of coil EV1 opposes that of coil EP1 while that of coil EV2 aids that of coil EP2. Reversal of the elevator motor velocity voltage reverses the effect of the M. M. F.'s. The pitch potentiometer voltage is also applied to coils on the same cores. In accomplishing this, the pitch potentiometer PP forms two legs of a bridge circuit including coils PP1 and PP2 as the remaining adjacent legs. The current distribution of coils PP1 and PP2 is controlled by connection of the movable tap of pitch potentiometer PP between the coils. Push-pull motion of handwheel HW drives the movable tap of potentiometer PP to either side of neutral position correspondingly controlling the currents of coils PP1 and PP2. A trim potentiometer ETRP having its movable tap common with that of the pitch potentiometer trims the bias of coils PP1 and PP2 to correct for off-center conditions. Here also linearity of electromagnet response obtains due to the biasing effect of the opposed sets of coils. The biasing voltage ($x$ to $z$) from the turn potentiometer system of the transient coordinator TC is applied to a single coil XZ3 of the pitch rate gyroscope electromagnet system. This coil is arranged on a core separate from the others and is disposed with respect to the armature therefor to produce biasing forces about the output axis of the pitch rate gyroscope to effect up-elevator. In view of the absence of polarizing and biasing coils on this electromagnet the response is unidirectional irrespective of polarity of the $x$ to $z$ voltage and obeys the square law. Thus the provision of linear biases on the turn and bank rate gyroscopes and the square law bias on the pitch rate gyroscope matches the system control with the square law governing the relation of up-elevator to bank angle. The vertical rate and vertical position quantities of the vertical rate control VRC are applied to coils VR5 and VR6 in dependence of the operation of contact sets VR1 and VR2. These coils are respectively connected in series with contacts VR1 and VR2, and one coil or the other is energized depending upon which of contacts VR1 and VR2 is engaged by the movable contact associated therewith. Since a linear response is here desired, a pair of biasing coils C1 and C2 are respectively applied to the oppositely disposed cores carrying the coils VR5 and VR6, coil C1 being on a core with coil VR5 and coil C2 being on a core with coil VR6. Coils C1 and C2 are connected in series across the power supply and their M. M. F.'s are in the same direction as that of the corresponding one of coils VR5 and VR6. The magnetic biasing effect of these coils with respect to coils VR5 and VR6 is such as to produce a linear magnet response to the current of coils VR5 or VR6.

Thus it will be observed that hovering operation of the contacts of the gyroscopes as hereinbefore mentioned is influenced in each case by a multiplicity of magnetic biases which operate in varying degrees and at various intervals to produce the required biasing effect on the gyroscopes of the system, and if desired contact hovering may be augmented by introducing unbalance vibration in the rotation of each gyroscope. In the instant case this is accomplished by providing a degree of dynamic unbalance in the rotating system of each gyroscope.

Recalling now the operating sequence of the control surfaces of an aircraft in initiating a turn as discussed in the opening pages of the descriptive disclosure, it will be remembered that the ailerons are applied to initiate an angle of bank together with the timed application of the rudder and elevators in a degree corresponding to the instantaneous angles of bank to provide the required turn and pitch velocities. In the functional description of the turn potentiometer system including the potentiometers TP$x$, TP$y$ and TP$z$, the voltages $y$ to $x$ and $x$ to $z$ are considered, the voltage $y$ to $x$ being the first produced biases the bank gyroscope initiating roll velocity for the accumulation of bank angle and as the voltage $y$ to $x$ is reduced to streamline the ailerons a second voltage is produced which biases the turn and pitch rate gyroscopes. Thus it will be observed that the control sequence outlined for the coordinated control of the surfaces maintaining equilibrium of the craft in a turn is obtained in the output of the turn potentiometer system.

The control arrangement affording this function includes, in addition to the turn potentiometer system, a control motor CM and a control relay CR. The relay CR controls the speed and direction of operation of the motor and to this end is provided with a pair of stationary contacts CR1 and CR2 which are selectively engaged by a movable contact CR3. Contact CR3 is actuated by the armature assembly of the relay which includes a pair of movable armatures CR4 and CR5, the forces of which are opposed in the mounting of movable contact CR3. The circuit system of the contacts of the relay affords a control of the motor armature terminal voltage to regulate the motor speed and direction of operation. Thus the motor field is preferably maintained constant either by permanent magnet means or the constantly excited field CMF illustrated.

The control of the relay is effected by a multiplicity of coils associated with the respective armatures. Since a control of the turn potentiometer system is desired to produce the gyroscope biasing voltages $y$ to $x$ and $x$ to $z$ as previously described, the voltage $y$ to $x$ is applied across relay coils XY3 and XY4 which are connected in series across movable taps $y$ and $x$. As in the case of the servomotors driving the control surfaces of the craft velocity damping of the control motor CM is also provided and is obtained from the bridge circuit including potentiometer P10 of which the tapped portions form adjacent legs and resistor R10 and the motor armature winding form the remaining adjacent legs. The bridge is balanced against the motor armature resistance when the motor is stationary and is unbalanced by the back E. M. F. produced during rotation and the voltage due to bridge unbalance is applied to coils CV1 and CV2 which are connected in series across the output terminals T10 of the bridge circuit and respectively occupy positions on relay armatures CR4 and CR5. The relay is polarized by coils C3 and C4 which are connected in series across the power supply. Thus for a voltage across movable taps $y$ and $x$ of one polarity, the M. M. F. of coil XY3 will add to that of polarizing coil C3, while that of coil XY4 will subtract from the M. M. F. of coil C4 producing unbalanced magnetic pulls in a direction to engage movable contact CR3 with stationary contact CR1. Reversal of the polarity of voltage $y$ to $x$ of course reverses the magnetic pull and contact CR3 engages CR2. The velocity feedback voltage across terminals T10 is fed back in a negative sense, that is the M. M. F. of coils CV1 and CV3 always opposes the M. M. F.'s of coils XY3 and XY4, respectively. The velocity voltage is independent of the motor load current by reason of the bridge circuit and as a consequence is zero when the motor stops. The circuit connections for energizing the motor armature circuit extend from a mid-tap $z$ on potentiometer TP$z$ representing the substantial midpoint of the source voltage, through the movable contact CR3 and stationary contact CR1 to the positive side of the source or through movable contact CR3 and stationary contact CR2 to the negative side of the source affording reversible polarity motor armature excitation. The rotor of motor CM drives the movable tap $x$ of potentiometer TP$x$ through a suitable system of gears which provide the desired rate of movement of movable tap $x$ for a given motor speed so as to effect a rate of reduction of the voltage $y$ to $x$ corresponding to the time constant of the craft about the roll axis for a given air speed and aileron displacement. With this circuit small voltages across the movable taps $y$ and $x$ will cause the relay contacts to apply full voltage to the motor armature for starting. As the negative feedback velocity voltage builds up with motor speed, a regulated motor speed results which is proportional to the voltage $y$ to $x$. This control is known to afford very good speed regulation at low motor speeds.

Thus to effect a turn the handwheel HW is rotated producing a voltage $y$ to $x$ which biases the bank rate gyroscope and the control relay CR. The control afforded by the bank rate gyroscope displaces the ailerons and produces roll velocity. At the same time the operation of the control relay energizes motor CM which drives the movable tap $x$ in a direction to reduce the $y$ to $x$ voltage. As the $y$ to $x$ voltage is decreased, the biasing effect thereof on the bank rate gyroscope decreases moving the ailerons toward streamlined position as the bank angle for the turn indicated by the setting of handwheel operated potentiometer TP$y$ is accumulated. Simultaneously, motion of the tap $x$ from neutral position produces a voltage between the movable tap $x$ and the tap $z$ of potentiometer TP$z$ which increases as the voltage $y$ to $z$ decreases. Hence, this voltage which biases the turn and pitch rate gyroscopes results in the application of the rudder and elevators in time phase with the bank angle producing the required turn and pitch velocities.

Fig. 2 covers an alternative arrangement for controlling potentiometer TP$x$. In this figure, parts corresponding to those of Fig. 1 bear like reference characters. In this embodiment of the invention the armature terminals of motor CM are connected across the movable taps $y$ and $x$ and the motor speed is directly controlled by the $y$ to $x$ voltage. Although this scheme offers certain advantages in simplicity, it will be appreciated that this control does not afford the fine degree of control obtainable with the control relay circuit previously described. However, in instances where close regulation for zero $y$ to $x$ voltages is not essential, the arrangement of Fig. 2 is satisfactory.

A further alternative for controlling the turn potentiometer system appears in Fig. 3. Here again parts corresponding to those of the preceding figures bear like reference characters. The arrangement herein disclosed embodies a dashpot 70 having a plunger 71 actuated by the rack and pinion assembly 72 operated by rotation of handwheel HW. The dashpot cylinder 73 having an orifice 74 therein is connected to a rack 75 meshing with a pinion 76 secured to a shaft 77 which connects with the movable tap $x$ of the potentiometer TP$x$. A pair of spiral springs 78 produce opposed torques on the movable tap shaft 77 which are balanced when the movable tap occupies a neutral position. The dashpot time constant is selected to provide the required rate of change of position of the movable tap $x$ under the influence of the torsion springs so that the required voltages are produced to control the aircraft for a coordinated turn. Thus rotation of handwheel HW displaces movable tap $y$ and through the dashpot rack and pinion linkage also displaces movable tap $x$. This produces a voltage between movable tap $x$ and tap $z$ of potentiometer TP$z$ which in this instance is used to bank the aircraft, that is, voltage $x$ to $z$ is applied to coils XY1 and XY2. Due to the unbalance of torques of the spiral springs a restoring torque acts on shaft 77 tending to return movable tap $x$ to its neutral position. The rate of return of movable tap $x$ however depends upon the rate of relative movement of the cylinder and piston of the dashpot, which as mentioned above, is such as to provide the required rate of change of voltages. Thus as the voltage $x$ to $z$ decreases upon a restoring movement of movable tap $x$, a voltage $y$ to $x$ appears and increases at a rate corresponding to the rate of decrease of the voltage $x$ to $z$. In this embodiment the voltage $y$ to $x$ is used to bias the turn and pitch rate gyroscopes, that is, voltage $y$ to $x$ is applied to the pair of coils XZ1, XZ2 and to the coil XZ3.

Fig. 3 may be modified as follows:

I. a. Potentiometer TP$x$ remains dashpot driven and spring centered.

b. Potentiometer TP$y$ may be spring driven or coupled to the handwheel and dashpot coupled to a fixed point to delay its excursions, the voltage $x$ to $z$ being employed to bank the aircraft and the voltage $y$ to $z$ being used for turn and up-elevator.

II. a. Potentiometer TP$x$ may be controlled by the handwheel.

b. Potentiometer TP$y$ may be spring driven by the handwheel and dashpot impeded in its excursions, the voltage $y$ to $x$ being used for banking and the voltage $y$ to $z$ being used for turn and up-elevator.

In ascertaining the magnitudes of the biases to be applied to the respective gyroscopes, a consideration of flight speed is required. In the operation of commercial types of aircraft the usual practice is to operate the craft at its normal cruising speed over the major portion of a given flight. At this speed the reaction of the craft to applications of the control surfaces may be ascertained and the system calibrated to provide the required timing and relative magnitudes of the transient coordinator voltages applied to the turn, bank and pitch gyroscope biasing systems to effect coordination of control for maintaining equilibrium in a turn. The necessary timing is conveniently obtained in the selection of the gear ratio between the control motor and the potentiometer TP$x$, while the relative magnitudes of the voltages are controlled by series connected resistors R11, R12 and R13 respectively in the circuits of the pair of biasing coils XZ1 and XZ2 of the turn rate gyroscope, the pair of biasing coils XY1 and XY2 of the bank rate gyroscope and the biasing coil XZ3 of the pitch rate gyroscope.

Although the system is calibrated for a given flight speed to provide the proper pitch velocity for the selected turn rate, it is not to be construed that the control is limited to the speed for which it is calibrated or to a narrow range of speeds thereabout. The vertical rate control VRC herein disclosed responds to vertical rates of motion and vertical displacements, and provides additional corrective bias to the pitch rate gyroscope to regulate diving and climbing to a very low rate and to limit the total vertical excursion or, alternatively to a definite set in rate depending upon the push-pull displacement of the handwheel HW. Additionally, any tendency of the craft to skid or side slip during a turn is detected in the side acceleration response of the bank rate gyroscope which continually regulates the aileron setting for equilibrium in the turn. Similarly, due to the cross connection of the aileron system and the rudder system in the bank voltage potentiometer BVP and the skid voltage potentiometer SVP, the tendency of the control is to match the turn velocity and the bank angle.

While an adjustment for different air speeds is hardly necessary in view of the inherent stability of the system at all speed of flight, the system is easily recalibrated for the full range of speeds either as an automatic function of the instant airspeed or, manually by the pilot, by suitable control of resistors R11, R12 and R13. Such recalibration requires a consideration of the effect of speed on the control requirements of the craft. As the speed of an aircraft is increased, the air velocity past the various control surfaces increases. Thus for a given angular deflection of a control surface, the angular velocity of the craft about the corresponding control axis for a given speed of flight will be one value. As the speed of flight is increased the force of the airstream acting on the deflected control surface rises, increasing as the square of the speed and increasing the angular velocity about the mentioned control axis for a given deflection of the control surface. Hence, if the control is calibrated at cruising speed so that an aileron deflection is obtained producing a roll velocity, say, of the order of 10° per second, the same aileron deflection at a higher speed will increase the roll velocity and in a given interval of time the bank angle accumulated at the higher speed will be greater than that accumulated at cruising speed. The time required for the control motor to match the voltage of movable tap $x$ with that of movable tap $y$ for a given $y$ to $x$ voltage is determined by the gear ratio between the control motor and the movable tap $x$ which, as previously explained, may be selected to match the time constant of the potentiometer drive with that of the aircraft about the roll axis for a given speed of flight. Thus if it is required that the angular position of the handwheel is to indicate a given angle of bank it will be appreciated that a change in gear ratio or a recalibration of bias voltage is necessary to always bring the craft to a given bank angle for a particular angular setting of the handwheel.

It is more convenient to recalibrate the output of the potentiometer network for changes in air-speed and therefore a suitable control of resistor R12 is provided so that the magnitudes of the bias applied to the coils XY1 and XY2 of the bank gyroscope electromagnet is suitably changed as the speed is changed, producing an aileron deflection over the range of flight speeds to maintain the roll rate substantially constant for a given handwheel setting. This recalibration may be obtained as an automatic function of air speed by actuating the movable tap of resistor R12 from an airspeed responsive device AS having a structure 80 forming a chamber sealed by a flexible diaphragm assembly 81, the pressure within the chamber being controlled by the tube 82 communicating therewith having the open end thereof directed into the relative wind. It is realized that the device illustrated will produce an indication of true air speed only at an altitude of flight for which it is calibrated in the absence of a static tube. However, a complete air-speed indicator showing is not illustrated in the interest of simplicity. The movement of diaphragm 81 under the influence of the pressure within the chamber of structure 80 is utilized to adjust the movable tap of resistor R12 through any suitable mechanical linkage represented in the dotted line 83, increasing the resistance as the air speed increases and, hence, the pressure in the chamber of structure 80 increases, to correspondingly reduce the bank gyroscope bias and the aileron deflection for a given handwheel setting. As a consequence, the roll velocity, assuming proper recalibration over the entire speed range, can be maintained constant.

The considerations pertaining to recalibration of the circuits for the electromagnet of the pitch gyroscope in certain respects are analogous to those above made with regard to the ailerons. However, the additional factor of pitch attitude changes to maintain level flight over a range of air speeds is introduced. The pitch attitude controls the angle of attack of the wing of the aircraft and is adjusted for level flight at a given speed so that the wing lift balances the force due to gravity. Since the wing lift is a function of the square of the speed, it will be appreciated that the angle of attack of the wing at higher speeds must be reduced if the condition of level flight is to be maintained. As a rule the change in pitch attitude to effect the change in angle of attack on larger commercial craft is made by re-trimming the horizontal stabilizing surfaces of the craft, which ordinarily suffices for level flight.

In a turn, however, the pitch attitude in some degree as well as the pitch velocity is determined by the amount of up-elevator that is applied. Thus the recalibration of the biasing voltage applied to the coils XZ3 of the pitch gyroscope requires a consideration of the changing response of the elevators with air speed and the change of pitch attitude with air speed. As in the case of the bank circuits, the elevator circuit is conveniently recalibrated by means of the link system 84 connecting the movable tap of resistor R13 with diaphragm 81 so that the value of resistor R13 is increased as the speed of the craft is increased lowering the coil bias and the amount of application of up-elevator.

With regard to recalibration of the rudder circuit, since yaw or turn velocity is proportional to bank angle the primary consideration is the changing response of the rudder with air speed. Again this recalibration is conveniently made by adjusting the tap of resistor R11 through a link system 85 connecting with the diaphragm 81.

The need for recalibration of the gyroscope biasing circuits will vary depending upon the requirements of a given installation and in many instances the above-described refinements may be unnecessary. A less complicated alternative affording a range of recalibration for three selected air speeds, for instance, would involve simply a three-position mechanism operated by the pilot for varying the setting of any one or all of the resistors R11, R12 and R13. An air speed below cruising speed could be represented in a low setting of the mechanism. An intermediate position would then afford a resistor setting corresponding to cruising speed while the upper range of speeds would correspond to the high setting of the mechanism.

An improvement over the hereinbefore-mentioned copending application of I. M. Holliday et al., Serial No. 785,984, is provided in the control of the cam operated switch S5 by the control motor CM. In the application of I. M. Holliday et al., switch S5 is controlled directly by the handwheel. Thus upon handwheel rotation to initiate a turn, the switch is opened and to complete the turn the handwheel is centered closing the switch. In this application, as in that of I. M. Holliday et al., the switch S5 is in series in the circuit of conductors S5C for the coil of brake B. From the discussion hereinbefore made, it will be recalled that brake B is energized by switch S5 during fixed course control and locks the rotor of synchro unit S while at the same time opening the short circuit through contacts B1 permitting the application of a rotor winding signal to the course unit amplifier. During turns switch S5 is opened deenergizing the coil of brake B. The brake is spring biased open unlocking the rotor of synchro unit S and shorting the rotor winding and the rotor then follows the motion of the plane in the turn due to the error signal applied to the synchro unit stator from the direction indicator.

When the plane is in a turn and the handwheel is rotated to neutral position, a direct connection of the handwheel to switch S5 affects closing thereof when neutral position is reached promptly energizing the brake B to lock the rotor of unit S and permitting the application of course error signals to the course unit amplifier. Thus the system is enabled for fixed course control at the instant the handwheel is centered, but if the motion of the handwheel to neutral position was rapid enough the plane may yet be in the turn. If the autopilot is slaved at this instant, the aircraft will overshoot the course and then return to the fixed course after several oscillations. To prevent this overshoot, the switch S5 is preferably delayed in closing until the craft has returned to level flight and this is accomplished by driving the cam of switch S5 from the shaft which operates the movable tap $x$ of potentiometer TP$x$. Since the time delay in this drive is such as to center the potentiometer at approximately the instant the bank angle becomes zero the switch S5 remains open until the ship has leveled off from the turn on the selected course after which the brake B is energized and the synchro unit circuits set for fixed course operation.

A variation of the servo systems for the control surface drives appears in Figs. 4a and 4b in the provision of a regulator actuated by the corresponding gyroscope in each of the control sections of the systems which eliminates the need of a generator in each of the servo systems. The regulators are respectively designated RR, AR and ER for the rudder, aileron and elevator servo systems. Since the details of these regulators are the same, a description of that of the rudder section of the system will suffice for all.

Each regulator comprises a pair of oppositely disposed stacks of flexible conductors 90 which are insulatedly supported in spaced relation in supports 91. The free extremities of the flexible conductors bear against a sloping surface of stop 92 which limits the flexing motion of each conductor in one direction and at the same time uniformly spaces the said free extremities so that the contacts carried thereby are spaced a predetermined distance apart. A prod 93 disposed between the opposed stacks of conductors is actuated by the output motion of the corresponding gyroscope, in the rudder section this being gyroscope TG, so that output motion or torque in one direction or the other selectively deflects the opposed sets of flexible conductors and closes contacts thereof.

Each of the control surface motors RM, AM and EM is arranged with the armature winding thereof as one leg in a bridge circuit the same as in Figs. 1a and 1b. The energizing circuit for the rudder motor bridge circuit includes a pair of resistors RR3 and RR3' which are connected across the positive and negative (+), (−) conductors indicated. This circuit begins at junction point J1 on the positive conductor and extends to junction point J2, then extends through resistor RR3 to junctions J3 and J4, through resistor RR3' to junctions J5 and J6 which is on the negative conductor. One input terminal J7 of the bridge circuit connects with the common conductor containing junctions J3 and J4, and therefore connects to a point between the resistors RR3 and RR3'. Since resistors RR3 and RR3' are preferably of substantially equal ohmic values for this application, the voltage of input terminal J7 is approximately the midpoint of the voltage across the positive and negative conductors.

The remaining input terminal J8 of the bridge circuit is selectively connected to either of the positive or negative conductors through contact elements of the flexible conductors of the regulator. These contact elements forming in effect a switch in each circuit are carried by the first two flexible conductors adjacent prod 93. On the upper regulator stack as viewed in Fig. 4a, these contacts are designated RC1 and RC2. On the lower regulator stack they are designated RC1' and RC2'. One circuit from bridge input terminal J8 extends through contacts RC1, RC2, a resistor RR2 to junction J5 and the negative conductor at junction J6. The second circuit from terminal J8 extends through contacts RC1', RC2' and resistor RR2' to junction J2 and the positive conductor at junction J1. As thus far described, the bridge circuit containing the rudder motor armature winding is selectively connected between the resistors RR3 and RR3' and the positive and negative conductors upon closure, respectively, of contacts RC1', RC2' or RC1, RC2 affording reversal of bridge excitation and motor operation depending upon the direction of operation of the turn gyroscope TG. Inasmuch as resistors RR2 and RR2' are of fixed ohmic value, the speed of operation of the rudder motor in each rotational direction is fixed in value upon closure of one or the other set of the switch contacts. Blocks 94 space the switch elements of each contact stack from the remainder of the stack so that the switch contacts may not engage other contacts of the stack.

The speed of the motor is regulated by the remainder of the contacts of each stack which form a series-parallel resistor network with the corresponding one of resistors RR3 and RR3' upon progressive closure of the contacts of each stack. Considering now the upper regulator stack of Fig. 4a, contact RC3 is connected at J9 to a suitable tap along resistor RR3. Contact RC4 engaged by contact RC3 is connected in series with resistor RR4 to one side of resistor RR3. Contact RC5 engaged by contact RC4 is connected in series with resistor RR5 to the opposite side of resistor RR3. Contact RC6 engaged by contact RC5 is connected in series with resistor RR6 to said one side of resistor RR3. And contact RC7 engaged by contact RC6 is connected in series with resistor RR7 to the opposite side of resistor RR3. Contacts RC3' through RC7' are similarly connected with respect to resistor RR3' and the associated resistors RR4' through RR7'.

Assuming now that the output motion of the turn gyroscope TG is in a direction to close switch contacts RC1 and RC2 a circuit connecting the rudder motor armature winding across the positive and negative conductors is established, beginning at junction J1 on the positive conductor and including junction J2, resistor RR3, junction J3, junction J7, the rudder motor armature winding bridge circuit, junction J8, contacts RC1 and RC2, resistor RR2 and junction J5 to the negative conductor at junction J6. The motor now operates at some predetermined low speed in a direction determined by the polarity of the voltage across input terminals J7 and J8 of the bridge circuit. Progressive closure of contacts RC3 through RC7 progressively connects resistor RR4 across one portion of resistor RR3, resistor RR5 across the remaining portion of resistor RR3, resistor RR6 in parallel with resistor RR4 and resistor RR7 in parallel with resistor RR5 forming a series-parallel network in which the total resistance between the positive conductor and bridge terminal J7 is progressively reduced increasing the voltage of terminal J7 and, hence, increasing the voltage across the bridge circuit, to increase the motor speed.

When terminal J8 is connected to the positive conductor through contacts RC1', RC2' and resistor RR2', the total resistance across the series-parallel network including resistors RR3' through RR7' is progressively reduced lowering the voltage of terminal J7 to increase the voltage drop across terminals J7 and J8 increasing the motor speed in the reverse direction.

The range of control of the motor afforded by the regulator can be extended as desired by changing the relative values of the circuit constants or by adding additional contact stages. Similarly the change in control from contact to contact can be made more or less perceptible by proper choice of circuit constants. Thus the regulator is adapted for a wide variety of applications. Since the flexible conductors carrying the switch contacts, for example contacts RC1 and RC2, carry all the current of the motor armature, these are made sufficiently heavy, that is, of sufficient cross sectional area to carry the maximum motor current. However, unlike the conventional regulator in which the contacts of the flexible conductors progressively shunt tapped portions of a control impedance and each flexible conductor must therefore be capable of carrying the motor load current, the flexible conductors carrying contacts RC3 through RC7 when engaged by the preceding contact of the group form part of parallel circuits of the network and therefore carry measurably smaller currents. For this reason they may be of considerably smaller cross section than the flexible conductors of conventional regulators and, hence, be less stiff mechanically, resulting in better response to available output torques of the associated gyroscope.

The foregoing description applies equally to the aileron regulator system, AR and the elevator regulator system ER in which corresponding parts bear reference characters the same as those of the rudder except that in each case the first letter A or E for the ailerons and elevator, respectively, are substituted for the first letter R of the reference characters of the rudder section.

In this embodiment of the present invention, the skid voltage potentiometer SVP has been eliminated. In Figs. 1a and 1b, it will be recalled this potentiometer SVP was connected in the field circuit of the aileron generator and was energized in one direction or the reverse direction depending upon which of the bank gyroscope contacts BC1 or BC2 was engaged by the movable contact. The tapped voltage taken from the bank voltage potentiometer was applied in series with the velocity feedback voltage of the rudder motor taken from terminals T1 of the rudder motor bridge circuit. Inasmuch as the control afforded by the transient coordinator circuits producing the $x$ to $z$ voltage provides rudder application in phase with the bank angle, the refinement of control offered by the bank voltage is likely not to be a practical necessity. Therefore the rudder velocity feedback is taken directly from terminals T1 of the rudder motor bridge circuit and applied across series connected coils RV1 and RV2, the M. M. F.'s of which compare with the M. M. F.'s of coils RP1 and RP2 so that for one direction of motor operation, for example, the M. M. F. of coil RV1 opposes that of coil RP1 while the M. M. F. of coil RV2 aids that of coil RP2 to produce an unbalanced magnetic force on the armature which biases the turn gyroscope about its output axis. The function of coils XZ1, XZ2 and CU1, CU2 remains unchanged.

The bank voltage potentiometer BVP is now connected directly across the armature winding terminals of the rudder motor but unlike the arrangement of Figs. 1a and 1b is not applied in series with the velocity feedback voltage of the aileron motor to a single set of coils on the bank gyro. In Figs. 1a and 1b, isolation of the circuits was afforded in the field circuit of the rudder generator. Since such isolation is not present when the bank voltage potentiometer is connected across the armature terminals of the rudder motor, it is preferred that the bank voltage and the aileron velocity feedback voltage be applied to separate coils on the same electromagnet of the bank gyroscope. Thus the bank voltage is applied over conductors BV1C and BV2C across a pair of series connected coils BV1 and BV2 on oppositely disposed electromagnet cores of the bank gyroscope BG and the aileron motor velocity feedback voltage taken from terminals T2 of the aileron motor bridge is applied across a pair of series connected coils AV1 and AV2 on the same oppositely disposed cores of the bank gyroscope electromagnet. The combined effect of these coils BV1, BV2 and AV1, AV2 is the same as that of coils BV1 and BV2 of Figs. 1a and 1b having both voltages applied thereto but in this embodiment, isolation of the bank voltage and aileron velocity voltage is obtained at the coils to which they are applied.

The function of the remaining elements of the system being the same as corresponding elements of Figs. 1a and 1b will be understood from the descriptive disclosure before made. In Figs. 4a and 4b, parts corresponding to those of Figs. 1a and 1b bear like reference characters.

The foregoing disclosure and the showings made in the drawings are merely illustrative of the principles of this invention and are not to be interpreted in a limiting sense. The only limitations are to be determined from the scope of the appended claims.

We claim as our invention:

1. In a control for an aircraft having turn control means, roll control means and pitch control means, the combination of, a first potentiometer having a movable tap, piloting means for operating the movable tap of said first potentiometer, a second potentiometer having a movable tap, motor means for driving the movable tap of said second potentiometer, a third potentiometer having a tap, means for supplying electrical energy to said potentiometers, circuit means responsive to the voltage difference of the movable taps of said first and second potentiometers for energizing said motor means, means responsive to the voltage difference of the movable taps of said first and second potentiometers for controlling said roll control means, and means responsive to the voltage difference of the movable tap of said second potentiometer and the tap of said third potentiometer for controlling said turn control means and said pitch control means.

2. In a control for an aircraft having turn control means, roll control means and pitch control means the combination of, means for producing a first control voltage, time delay means operable during a predetermined interval of time for reducing said first control voltage to zero and producing a second control voltage, means responsive to said first control voltage for controlling said roll control means, and means responsive to said second control voltage for controlling said turn control means and said pitch control means.

3. In a control for an aircraft having turn control means, roll control means and pitch control means, the combination of, means for producing a first control voltage, power means operable as a function of said first control voltage for reducing said first control voltage to zero over a predetermined interval of time and producing a second control voltage as said first control voltage is reduced to zero, means responsive to said first control voltage for controlling said roll control means, and means responsive to said second control voltage for controlling at least said pitch control means.

4. In a control for a craft operable in space and having freedom of motion about a plurality of control axes, the combination of, means for producing a first control voltage, time delay means for reducing said first control voltage to zero and producing a second control voltage as said first control voltage is reduced, means responsive to said first control voltage for controlling said craft about one of said axes of freedom, and means responsive to said second control voltage for controlling said craft about another of said axes of freedom.

5. In a control for a craft operable in space and having freedom of motion about a plurality of control axes, the combination of, a pair of potentiometers, piloting means for producing a first voltage between said pair of potentiometers, a third potentiometer, means operable as a function of the first voltage for controlling one of said potentiometers to reduce said first voltage to zero and producing a second voltage between said one potentiometer and said third potentiometer, means responsive to said first voltage for controlling said craft about one of said axes, and means responsive to said second voltage for controlling said craft about another of said axes.

6. In a control for a craft operable in space and having freedom of motion about a plurality of control axes, the combination of, a normally electrically balanced electrical network, piloting means for electrically unbalancing one portion of said electrical network, means responsive to and operable as a function of the unbalance of said electrical network for balancing said one portion of said electrical network and simultaneously electrically unbalancing another portion of said electrical network, means responsive to the electrical unbalance of said one portion of said electrical network for controlling said craft about one of said axes, and means responsive to the electrical unbalance of the other portion of said electrical network for controlling said craft about another of said axes.

7. In a control for a craft operable in space and having turn control means, roll control means and pitch control means, the combination of, an electrical network comprised of at least two normally electrically balanced sections, piloting means for electrically unbalancing one of said sections, means responsive to and operable as a function of the unbalance of said one section of said electrical network for electrically balancing said one section of said electrical network and at the same time electrically unbalancing a second section of said electrical network, means responsive to the electrical unbalance of said one section of said electrical network for controlling said roll control means, and means responsive to the electrical unbalance of said second section of said electrical network for controlling said turn control means.

8. In a control for a craft operable in space and having turn control means, roll control means and pitch control means, the combination of, an electrical network comprised of at least two normally electrically balanced sections, piloting means for electrically unbalancing one of said sections, means operable as a function of the unbalance of said one section of said electrical network for electrically balancing said electrical network and at the same time electrically unbalancing a second section of said electrical network, means responsive to the electrical unbalance of said one section of said electrical network for controlling said roll control means, means responsive to the electrical unbalance of said second section of said electrical network for controlling said turn control means, and means responsive to the electrical unbalance of said second section of said electrical network for controlling said pitch control means.

9. In a control for a craft operable in space and having turn control means, roll control means and pitch control means, the combination of, an electrical network comprised of at least two normally electrically balanced sections, piloting means for electrically unbalancing one of said sections, means operable as a function of the unbalance of said one section of said electrical network for electrically balancing said electrical network and at the same time electrically unbalancing a second section of said electrical network, means responsive to the electrical unbalance of said one section of said electrical network for controlling said roll control means and means responsive to the electrical unbalance of said second section of said electrical network for controlling said pitch control means.

10. In a control for a craft operable in space and having turn control means, roll control means, and pitch control means, the combination of, an electrical network having two normally electrically balanced sections, piloting means having two degrees of freedom of motion, means responsive to motion of said piloting means in one of said two degrees of freedom for electrically unbalancing one section of said electrical network, means operable as a function of the electrical unbalance of said one section of said electrical network for electrically balancing said one section and electrically unbalancing the second section of said electrical network, means responsive to the electrical unbalance of said one section of said electrical network for controlling said roll control means, means responsive to the electrical unbalance of said second section of said electrical network for controlling said turn control means, and means responsive to motion of said piloting means in the second of said two degrees of freedom for controlling said pitch control means.

11. In a control for a craft operable in space and having turn control means, roll control means, and pitch control means, the combination of, an electrical network having two normally electrically balanced sections, piloting means having two degrees of freedom of motion, means responsive to motion of said piloting means in one of said two degrees of freedom for electrically unbalancing one section of said electrical network, means operable as a function of the electrical unbalance of said one section of said electrical network for electrically balancing said one section and electrically unbalancing the second section of said electrical network, means responsive to the electrical unbalance of said one section of said electrical network for controlling said roll control means, means responsive to the electrical unbalance of said second section of said electrical network for controlling said turn control means, means responsive to the electrical unbalance of said second section of said electrical network for controlling said pitch control means, and means responsive to motion of said piloting means in the second of said two degrees of freedom for controlling said pitch control means.

12. In a control for a craft operable in space and having turn control means, roll control means, and pitch control means, the combination of, an electrical network having two normally electrically balanced sections, piloting means having two degrees of freedom of motion, means responsive to motion of said piloting means in one of said two degrees of freedom for electrically unbalancing one section of said electrical network means operable as a function of the electrical unbalance of said one section of said electrical network for electrically balancing said one section and electrically unbalancing the second section of said electrical network, means responsive to the electrical unbalance of said one section of said electrical network for controlling said roll control means, means responsive to the electrical unbalance of said second section of said electrical network for controlling said pitch control means, and means responsive to motion of said piloting means in the second of said two degrees of freedom for controlling said pitch control means.

13. In a control for a craft operable in space and having turn control means, roll control means and pitch control means, the combination of, piloting means having two degrees of freedom, means responsive to motion of said piloting means in one of said two degrees of freedom for producing a first control quantity, means operable as a function of said first control quantity for reducing said first control quantity to zero and producing a second control quantity, means responsive to said first control quantity for controlling said roll control means, means responsive to said second control quantity for controlling said turn control means, and means responsive to motion of said piloting means in the second of said two degrees of freedom for controlling said pitch control means.

14. In a control for a craft operable in space and having turn control means, roll control means and pitch control means, the combination of, piloting means having two degrees of freedom, means responsive to motion of said piloting means in one of said two degrees of freedom for producing a first control quantity, means operable as a function of said first control quantity for reducing said first control quantity to zero and producing a second control quantity, means responsive to said first control quantity for controlling said roll control means, means responsive to said second control quantity for controlling said turn control means, means responsive to said second control quantity for controlling said pitch control means, and means responsive to motion of said piloting means in the second of said two degrees of freedom for controlling said pitch control means.

15. In a control for a craft operable in space and having roll control means and pitch control means, the combination of, piloting means having two degrees of freedom, means responsive to said piloting means in one of said two degrees of freedom for producing a first control quantity, means operable as a function of said first control quantity for reducing said first control quantity to zero and producing a second control quantity, means responsive to said first control quantity for controlling said roll control means, means responsive to said second control quantity for controlling said pitch control means, and means responsive to motion of said piloting means in the second of said two degrees of freedom for controlling said pitch control means.

16. In a control for a craft operable in space and having turn control means, roll control means and pitch control means, the combination of, course control means for producing a control quantity indicative of the course of travel of said aircraft with respect to a predetermined course, means responsive to said control quantity of said course control means for controlling said turn control means, piloting means, means responsive to said piloting means for preventing said control quantity of said course control means for controlling said turn control means, means responsive to said piloting means for producing a first control quantity, means operable as a function of said first control quantity for reducing said first control quantity to zero and producing a second control quantity, means responsive to said first control quantity for controlling said roll control means, and means responsive to said second control quantity for controlling said pitch control means.

17. In a control for a craft operable in space and having turn control means, roll control means and pitch control means, the combination of, course control means for producing a control quantity indicative of the course of travel of said aircraft with respect to a predetermined course, means responsive to said control quantity of said course control means for controlling said turn control means, piloting means, means responsive to said piloting means for preventing said control quantity of said course control means from controlling said turn control means, means responsive to said piloting means for producing a first control quantity, means operable as a function of said first control quantity for reducing said first control quantity to zero and producing a second control quantity, means responsive to said first control quantity for controlling said roll control means, means responsive to said second control quantity for controlling said turn control means, and means responsive to said second control quantity for controlling said pitch control means.

18. In a control for a craft operable in space and having turn control means and roll control means, the combination of, course control means for producing a control quantity indicative of the course of travel of said craft with respect to a predetermined course, means responsive to said control quantity of said course control means for controlling said turn control means, piloting means, means responsive to said piloting means for preventing said control quantity of said course control means from controlling said turn control means, means responsive to said piloting means for producing a first control quantity, means operable as a function of said first control quantity for reducing said first control quantity to zero and producing a second control quantity, means responsive to said first control quantity for controlling said roll control means, and means responsive to said second control quantity for controlling said turn control means.

19. In a control for a craft operable in space and having turn control means, roll control means and pitch control means, the combination of, course control means for producing a course control quantity indicative of the course of travel of said aircraft with respect to a given course, means responsive to said course control quantity for controlling said turn control means, piloting means, means responsive to said piloting means for preventing said course control quantity from controlling said turn control means, a pair of normally balanced electrical circuits, means responsive to said piloting means for electrically unbalancing one of said electrical circuits, means responsive to the electrical unbalance of said one electrical circuit for rebalancing said one electrical circuit and for electrically unbalancing the second of said pair of circuits, means responsive to the electrical unbalance of said one electrical circuit for controlling said roll control means, and means responsive to the electrical unbalance of the second electrical circuit for controlling said pitch control means.

20. In a control for a craft operable in space and having turn control means, roll control means and pitch control means, the combination of, course control means for producing a course control quantity indicative of the course of travel of said aircraft with respect to a given course, means responsive to said course control quantity for controlling said turn control means, piloting means, means responsive to said piloting means for preventing said course control quantity from controlling said turn control means, a pair of normally balanced electrical circuits, means responsive to said piloting means for electrically unbalancing one of said electrical circuits, means responsive to the electrical unbalance of said one electrical circuit for rebalancing said one electrical circuit and for electrically unbalancing the second of said pair of circuits, means responsive to the electrical unbalance of said one electrical circuit for controlling said roll control means, means responsive to the electrical unbalance of said second electrical circuit for controlling said turn control means, and means responsive to the electrical unbalance of the second electrical circuit for controlling said pitch control means.

21. In a control for a craft operable in space and having turn control means, and roll control means, the combination of, course control means for producing a course control quantity indicative of the course of travel of said aircraft with respect to a given course, means responsive to said course control quantity for controlling said turn control means, piloting means, means responsive to said piloting means for preventing said course control quantity from controlling said turn control means, a pair of normally balanced electrical circuits, means responsive to said piloting means for electrically unbalancing one of said electrical circuits, means responsive to the electrical unbalance of said one electrical circuit for rebalancing said one electrical circuit and for electrically unbalancing the second of said pair of circuits, means responsive to the electrical unbalance of said one electrical circuit for controlling said roll control means, and means responsive to the electrical unbalance of said second electrical circuit for controlling said turn control means.

22. In a control for a craft operable in space and having turn control means, roll control means and pitch control means, the combination of, course control means for controlling said turn control means, altitude control means for controlling said pitch control means, piloting means having two degrees of freedom, a pair of normally balanced electrical circuits, means responsive to movement of said piloting means in one of said two degrees of freedom for electrically unbalancing one of said pair of normally balanced electrical circuits, means operable as a function of the electrical unbalance of said one electrical circuit for reducing the electrical unbalance of said one electrical circuit to zero and at the same time electrically unbalancing the second of said pair of normally balanced electrical circuits, means responsive to movement of said piloting means in said one degree of freedom for preventing said course control means from controlling said turn control means, means responsive to the electrical unbalance of said one electrical circuit for controlling said roll control means, means responsive to the electrical unbalance of said second electrical circuit for controlling said pitch control means, and means responsive to movement of said piloting means in the second of said two degrees of freedom for controlling said altitude control means.

23. In a control for a craft operable in space and having turn control means, roll control means and pitch control means, the combination of, course control means for controlling said turn control means, altitude control means for controlling said pitch control means, piloting means having two degrees of freedom, a pair of normally balanced electrical circuits, means responsive to movement of said piloting means in one of said two degrees of freedom for electrically unbalancing one of said pair of normally balanced electrical circuits, means operable as a function of the electrical unbalance of said one electrical circuit for reducing the electrical unbalance of said one electrical circuit to zero and at the same time electrically unbalancing the second of said pair of normally balanced electrical circuits, means responsive to movement of said piloting means in said one degree of freedom for preventing said course control means from controlling said turn control means, means responsive to the electrical unbalance of said one electrical circuit for controlling said roll control means, means responsive to the electrical unbalance of said second electrical circuit for controlling said turn control means, means responsive to the electrical unbalance of said second electrical circuit for controlling said pitch control means, and means responsive to movement of said piloting means in the second of said two degrees of freedom for controlling said altitude control means.

24. In a system of control for a conveyance operable in space and having roll control means and pitch control means, the combination of, piloting means, a pair of normally balanced electrical circuits, means responsive to said piloting means for electrically unbalancing one of said pair of normally balanced electrical circuits, a motor, means for energizing said motor in dependence of the electrical unbalance of said one electrical circuit, means responsive to operation of said motor for reducing the electrical unbalance of said one electrical circuit to zero and for electrically unbalancing the second of said pair of normally balanced electrical circuits, means responsive to the electrical unbalance of said one electrical circuit for controlling said roll control means, and means responsive to the electrical unbalance of said second electrical circuit for controlling said pitch control means.

25. In a system of control for a conveyance operable in space and having turn control means, roll control means and pitch control means, the combination of piloting means, a pair of normally balanced electrical circuits, means responsive to said piloting means for electrically unbalancing one of said pair of normally balanced electrical circuits, a motor, means for energizing said motor in dependence of the electrical unbalance of said one electrical circuit, means responsive to operation of said motor for reducing the electrical unbalance of said one electrical circuit to zero and for electrically unbalancing the second of said pair of normally balanced electrical circuits, means responsive to the electrical unbalance of said one electrical circuit for controlling said roll control means, means responsive to the electrical unbalance of said second electrical circuit for controlling said turn control means, and means responsive to the electrical unbalance of said second electrical circuit for controlling said pitch control means.

26. In a control for a craft operable in space and having roll control means and pitch control means, the combination of, control means, means responsive to said control means for producing a first electrical quantity, a motor, means for energizing said motor in dependence of said first electrical quantity, means responsive to operation of said motor for reducing said first electrical quantity to zero and producing a second electrical quantity, means responsive to said first electrical quantity for controlling said roll control means, and means responsive to said second electrical quantity for controlling said pitch control means.

27. In a control for a craft operable in space and having turn control means, roll control means and pitch control means, the combination of, control means, means responsive to said control means for producing a first electrical quantity, a motor, means for energizing said motor in dependence of said first electrical quantity, means responsive to operation of said motor for reducing said first electrical quantity to zero and producing a second electrical quantity, means responsive to said first electrical quantity for controlling said roll control means, means responsive to said second electrical quantity for controlling said turn control means, and means responsive to said second electrical quantity for controlling said pitch control means.

28. In a control for a craft operable in space and having roll control means and pitch control means, the combination of, control means, means responsive to said control means for producing a first electrical quantity, a motor, a relay responsive to said first electrical quantity for controlling said motor, means responsive to operation of said motor for reducing said first electrical quantity to zero and producing a second electrical quantity, means responsive to said first electrical quantity for controlling said roll control means, and means responsive to said second electrical quantity for controlling said pitch control means.

29. In a control for a craft operable in space and having turn control means, roll control means and pitch control means, the combination of, control means, means responsive to said control means for producing a first electrical quantity, a motor, a relay responsive to said first electrical quantity for controlling said motor, means responsive to operation of said motor for reducing said first electrical quantity to zero and producing a second electrical quantity, means responsive to said first electrical quantity for controlling said roll control means, means responsive to said second electrical quantity for controlling said turn control means, and means responsive to said second electrical quantity for controlling said pitch control means.

30. In a control for a craft operable in space and having roll control means and pitch control means, the combination of, control means, means responsive to said control means for producing a first electrical quantity, a motor, a relay for controlling said motor, means responsive to said first electrical quantity for controlling said relay to operate said motor, means responsive to the velocity of operation of said motor for controlling said relay, means responsive to operation of said motor for reducing said first electrical quantity to zero and producing a second electrical quantity, means responsive to said first electrical quantity for controlling said roll control means, and means responsive to said second electrical quantity for controlling said pitch control means.

31. In a control for a craft operable in space and having turn control means, roll control means and pitch control means, the combination of, control means, means responsive to said control means for producing a first electrical quantity, a motor, a relay for controlling said motor, means responsive to said first electrical quantity for controlling said relay to operate said motor, means responsive to the velocity of operation of said motor for controlling said relay, means responsive to operation of said motor for reducing said first electrical quantity to zero and producing a second electrical quantity, means responsive to said first electrical quantity for controlling said roll control means, means responsive to said second electrical quantity for controlling said turn control means, and means responsive to said second electrical quantity for controlling said pitch control means.

32. In a control for a craft operable in space and having roll control means and pitch control means, the combination of, piloting means movable in each of two directions, means responsive to said piloting means for producing a first electrical quantity of a polarity depending upon the direction of motion of said piloting means, a relay, means for polarizing said relay, means responsive to said first electrical quantity for energizing said relay, a double pole contact assembly actuated by said relay, a motor, circuit means connecting said motor in circuit with said double pole contacts to energize said motor and control the direction of operation thereof, means responsive to the direction of operation of said motor for reducing said first electrical quantity and prducing a second electrical quantity, means responsive to said first electrical quantity for controlling said roll control means and means responsive to said second electrical quantity for controlling said pitch control means.

33. In a control for a craft operable in space and having turn control means, roll control means and pitch control means, the combination of, piloting means movable in each of two directions, means responsive to said piloting means for producing a first electrical quantity of a polarity depending upon the direction of motion of said piloting means, a relay, means for polarizing said relay, means responsive to said first electrical quantity for energizing said relay, a double pole contact assembly actuated by said relay, a motor, circuit means connecting said motor in circuit with said double pole contacts to energize said motor and control the direction of operation thereof, means responsive to the direction of operation of said motor for reducing said first electrical quantity and producing a second electrical quantity, means responsive to said first electrical quantity for controlling said roll control means, means responsive to said second electrical quantity for controlling said turn control means, and means responsive to said second electrical quantity for controlling said pitch control means.

34. In a control for a craft operable in space and having roll control means and pitch control means, the combination of, piloting means operable in each of two directions, means responsive to said pilot means for producing a first electrical quantity of a polarity depending upon the direction of motion of said piloting means, a relay having a pair of stationary contacts and a movable contact disposed to selectively engage said stationary contacts, means for polarizing said relay, means responsive to said first electrical quantity for controlling said relay, a motor circuit means connecting said motor with said stationary contacts and said movable contact to be energized thereby and selectively operate in each of two directions depending upon the operation of said contacts, means responsive to the velocity of operation of said motor for controlling said relay, means responsive to operation of said motor for reducing said first electrical quantity and producing a second electrical quantity, means responsive to said first electrical quantity for controlling said roll control means, and means responsive to said second electrical quantity for controlling said pitch control means.

35. In a control for a craft operable in space and having turn control means, roll control means and pitch control means, the combination of, piloting means operable in each of two directions, means responsive to said piloting means for producing a first electrical quantity of a polarity depending upon the direction of motion of said piloting means, a relay having a pair of stationary contacts and a movable contact disposed to selectively engage said stationary contacts, means for polarizing said relay, means responsive to said first electrical quantity for controlling said relay, a motor circuit means connecting said motor with said stationary contacts and said movable contact to be energized thereby and selectively operate in each of two directions depending upon the operation of said contacts, means responsive to the velocity of operation of said motor for controlling said relay, means responsive to operation of said motor for reducing said first electrical quantity and producing a second electrical quantity, means responsive to said first electrical quantity for controlling said roll control means, means responsive to said second electrical quantity for controlling said turn control means, and means responsive to said second electrical quantity for controlling said pitch control means.

36. In a control for a craft operable in space and having roll control means and pitch control means, the combination of, piloting means operable in each of two directions, means responsive to said piloting means for producing a first electrical quantity of a polarity depending upon the direction of movement of said piloting means, a motor, circuit means responsive to said first electrical quantity for energizing said motor in one sense or reversed sense depending upon the polarity of said first electrical quantity, means operated by said motor for reducing said first electrical quantity and producing a second electrical quantity of a polarity depending upon the polarity of said first electrical quantity, means responsive to said first electrical quantity for controlling said roll control means, and means responsive to said second electrical quantity independently of the polarity thereof for effecting a unidirectional control of said pitch control means.

37. In a control for a craft operable in space and having turn control means, roll control means and pitch control means, the combination of, piloting means operable in each of two directions, means responsive to said piloting means for producing a first electrical quantity of a polarity depending upon the direction of movement of said piloting means, a motor, circuit means responsive to said first electrical quantity for energizing said motor in one sense or a reversed sense depending upon the polarity of said first electrical quantity, means operated by said motor for reducing said first electrical quantity and producing a second electrical quantity of a polarity depending upon the polarity of said first electrical quantity, means responsive to said first electrical quantity for controlling said roll control means, means responsive to said second electrical quantity for controlling said turn control means, and means responsive to said electrical quantity independently of the polarity thereof for effecting a unidirectional control of said pitch control means.

38. In a control for a craft operable in space and having roll control means and pitch control means, the combination of, piloting means operable in each of two directions, means responsive to said piloting means for producing a first electrical quantity of a polarity depending upon the direction of movement of said piloting means, a motor, circuit means responsive to said first electrical quantity for energizing said motor in one sense or a reversed sense depending upon the polarity of said first electrical quantity, means responsive to the velocity of operation of said motor for controlling said circuit means, means operated by said motor for reducing said first electrical quantity and producing a second electrical quantity of a polarity depending upon the polarity of said first electrical quantity, means responsive to said first electrical quantity for controlling said roll control means, and means responsive to said second electrical quantity independently of the polarity thereof for effecting a unidirectional control of said pitch control means.

39. In a control for a craft operable in space and having turn control means, roll control means and pitch control means, the combination of, piloting means operable in each of two directions, means responsive to said piloting means for producing a first electrical quantity of a polarity depending upon the direction of movement of said piloting means, a motor, circuit means responsive to said first electrical quantity for energizing said motor in one sense or a reversed sense depending upon the polarity of said first electrical quantity, means responsive to the velocity of operation of said motor for controlling said circuit means, means operated by said motor for reducing said first electrical quantity and producing a second electrical quantity of a polarity depending upon the polarity of said first electrical quantity, means responsive to said first electrical quantity for controlling said roll control means, means responsive to said second electrical quantity for controlling said turn control means, and means responsive to said second electrical quantity independently of the polarity thereof for effecting a unidirectional control of said pitch control means.

40. In a control for turning a craft operable in space and having turn control means and roll control means, the combination of, course control means for operating said turn control means, piloting means for producing a first control quantity, circuit means responsive to said first control quantity for reducing said first control quantity to zero and producing a second control quantity, means responsive to said circuit means for making said course control means ineffective to control said turn control means, means responsive to said first control quantity for controlling said roll control means, and means responsive to said second electrical quantity for controlling said turn control means.

41. A regulating device for a means to be controlled comprising, in combination, a plurality of flexible metal strips, means insulatedly supporting said metal strips in spaced relation forming a stack thereof, a contact disposed on each metal strip in cooperative relation to a contact on an adjacent metal strip so that deflection of said metal strips from one side of said stack progressively engages said contacts, actuating means for deflecting said metal strips from said one side of said stack to engage said contacts, a switch operated by said actuating means upon motion thereof, a main resistor, circuit means connecting said main resistor and said switch in series with said means to be controlled to energize said means to be controlled and effect operation thereof, circuit means connecting the contact of the first metal strip from said one side of said stack to a point on said main resistor, a control resistor connected in series with each of the remaining of said contacts and the resistors of the alternate contacts being connected to opposite sides of said main resistor, and means responsive to operation of said means to be controlled for controlling said actuating means.

42. In a control for regulating the motion of a body operable in space about a given axis, the combination of, a plurality of flexible metal strips, means insulatedly supporting said metal strips in spaced relation forming a stack, a contact disposed on each metal strip in cooperative relation with a contact on an adjacent metal strip so that deflection of said metal strips from one side of said stack progressively engages said contacts, actuating means for deflecting said metal strips from said one side of said stack to engage said contacts, a switch actuated by said actuating means upon motion thereof, a main resistor, motor means, circuit means connecting said switch and said main resistor in series with said motor means to energize said motor means upon closure of said switch and effect operation thereof, circuit means connecting the contact of the first metal strip from said one side to a point on said main resistor, a control resistor connected in series with each of the remaining of said contacts and the resistors of the alternate contacts being connected to opposite sides of said main resistor, means responsive to operation of said motor means for controlling said body about said given axis, and means responsive to movement of said body about said given axis for controlling said actuating means.

43. Apparatus as set forth in claim 42 in which said means responsive to movement of said body about said given axis comprises a gyroscope disposed on said body to respond to motion of said body about said given axis.

44. Control apparatus for an electroresponsive device to be controlled comprising, in combination, a plurality of flexible metal strips, means insulatedly supporting said metal strips in spaced relation forming a stack thereof, a contact disposed on each metal strip in cooperative relation with a contact on an adjacent metal strip so that deflection of said metal strips from one side of said stack progressively engages said contacts, a main impedance element, circuit means connecting the contact of the first metal strip from said one side to a point on said main impedance element, a control impedance element connecting each remaining contact with one side of said main impedance element forming a network in which the successive contacts are alternately connected to opposite sides of said main impedance element, control means for deflecting said metal strips from said one side, and circuit means connecting said network with said electroresponsive device to control the energization thereof.

45. Control apparatus for an electroresponsive device to be controlled comprising, in combination, a plurality of flexible metal strips, means insulatedly supporting said metal strips in spaced relation forming a stack thereof, a contact disposed on each metal strip in cooperative relation with a contact on an adjacent metal strip so that deflection of said metal strips from one side of said stack progressively engages said contacts, a main impedance element, circuit means connecting the contact of the first metal strip from said one side to a point on said main impedance element, a control impedance element connecting each remaining contact with one side of said main impedance element forming a network in which the successive contacts are alternately connected to opposite sides of said main impedance element, control means for deflecting said metal strips from said one side, said control means being operable from a predetermined neutral position, switching means responsive to said control means, said switching means being opened when said control means occupies said neutral position and being closed when said control means occupies a position other than said neutral position, and circuit means connecting said main impedance element and said switching means in series with said electroresponsive device to control the energization thereof.

46. Apparatus for controlling a motor having an armature winding and means for producing a field flux comprising, in combination, a plurality of flexible metal strips, means insulatedly supporting said metal strips in spaced relation forming a stack thereof, a contact disposed on each metal strip in cooperative relation with a contact on an adjacent metal strip so that deflection of said metal strips from one side of said stack progressively engages said contacts, a main impedance element, circuit means connecting the contact of the first strip from said one side to a point on said main impedance element, a control impedance element connecting each remaining contact with one side of said main impedance element forming a network in which the successive contacts are alternately connected to opposite sides of said main impedance element, control means for deflecting said metal strips from said one side, an electrical bridge circuit including said motor armature winding as one leg thereof, said bridge circuit being balanced against the resistance of the motor armature winding when the armature winding is stationary and being unbalanced when the armature winding is rotating, circuit means connecting said main impedance element in series with said bridge circuit, means for applying electrical energy across said impedance element and said bridge circuit, control means for deflecting said flexible metal strips from said one side, and means responsive to the electrical unbalance of said bridge circuit for controlling said control means.

47. In a control for an aircraft having aileron control means and rudder control means, the combination of, means for producing a first control quantity for operating the aileron control means, a control device responsive to said first control quantity for reducing said first control quantity and simultaneously producing a second control quantity for controlling said rudder control means, and means for adjusting the magnitudes of said control quantities.

48. In a control for an aircraft having aileron control means and elevator control means, the combination of, means for producing a first control quantity for controlling said aileron control means, a control device responsive to said first control quantity for reducing said first control quantity and simultaneously producing a second control quantity for controlling said elevator control means, and means for adjusting the magnitudes of said control quantities.

49. In a control for an aircraft having aileron control means, rudder control means and elevator control means, the combination of, means for producing a first control quantity for controlling said aileron control means, a control device responsive to said first control quantity for reducing said first control quantity and simultaneously producing a second control quantity for controlling said rudder control means and said elevator control means, and means for adjusting the magnitudes of said control quantities.

50. In a control for an aircraft having aileron control means, rudder control means and elevator control means, the combination of, means for producing a first control quantity for controlling said aileron control means, a control device responsive to said first control quantity for reducing said first control quantity and simultaneously producing a second control quantity, means for applying said second control quantity to said rudder control means for effecting a control thereof, means for applying said second control quantity to said elevator control means for effecting a control thereof, and means for adjusting the magnitude at least of said first control quantity and the control quantity applied to said elevator control means.

51. In a control for a craft operable in space and having aileron control means and rudder control means for controlling said body about the roll axis and the yaw axis thereof, the combination of, means for producing a first control quantity for controlling said aileron control means, a control device responsive to said first control quantity for reducing said first control quantity and simultaneously producing a second control quantity for controlling said rudder control means, and airspeed means responsive to the speed of said craft for adjusting the magnitude of said control quantities.

52. In a control for a direct current motor having an armature winding and means for producing a field flux, the combination of, an electrical bridge circuit including said armature winding as one leg, said bridge circuit being balanced against the resistance of said armature winding when said armature winding is stationary, a two pole relay, contact means forming a part of said relay for reversibly energizing said bridge circuit, circuit means for producing a polarizing flux in each pole of said relay, a pair of potentiometers each having adjustable taps and connected to form a second electrical bridge circuit in which the tapped portions of said potentiometers form adjacent legs in the second bridge circuit, a coil on each pole of said relay, circuit means connecting said coils in series with the taps of said pair of potentiometers, means for adjusting one of said taps to unbalance said second bridge circuit, the unbalance current of said second bridge circuit flowing through said coils, said coils being arranged so that the flux of one is opposed to the polarizing flux of the associated pole and the flux of the other aids the polarizing flux of the associated pole for a given direction of unbalance of said second bridge circuit, the unbalanced fluxes of said relay operating said contact means to energize said armature winding to effect rotation thereof in a direction corresponding to the direction of unbalance of said second bridge circuit, means connecting the adjustable tap of the other potentiometers of said second bridge circuit to said motor to be driven thereby to rebalance said second bridge circuit, a second coil on each pole of said relay, circuit means connecting said second coils in series across the first mentioned bridge circuit to be energized by the unbalance thereof due to rotation of said armature winding, said second coils producing fluxes in the poles associated therewith in opposition to the fluxes of the first mentioned coils.

53. In a control for a craft operable in space and having roll control means and pitch control means for effecting movement of the craft about its roll and pitch axes respectively, the combination of, means for producing a first control voltage, time delay means for reducing said first control voltage and producing a second control voltage as said first control voltage is reduced, circuit connections for applying said first control voltage to the roll control means, and circuit connections for applying said second control voltage to the pitch control means.

54. In a control for a craft operable in space and having roll control means and yaw control means for effecting movement of the craft about its roll and yaw axes respectively, the combination of, means for producing a first control voltage, time delay means for reducing said first control voltage, and producing a second control voltage as said first control voltage is reduced, circuit connections for applying said first control voltage to the roll control means, and circuit connections for applying said second control voltage to the yaw control means.

55. In a control for a craft operable in space and having yaw control means, roll control means and pitch control means for effecting movement of the craft about its yaw, roll and pitch axes respectively, the combination of, means for producing a first control voltage, time delay means for reducing said first control voltage and producing a second control voltage as said first control voltage is reduced, circuit connections for applying said first control voltage to the roll control means, circuit connections for applying said second control voltage to the yaw control means, and circuit connections for applying the second control voltage to the pitch control means.

56. In a control for a craft operable in space and having roll control means and pitch control means for effecting movement of the craft about its roll and pitch axes respectively, the combination of, a movable member having at least one degree of freedom of movement, electrical circuit means responsive to movement of said movable member in said one degree of freedom for producing a first voltage of transient character and for producing a second voltage delayed in time with respect to said first voltage, circuit connections for applying said first voltage to the roll control means, and circuit connections for applying said second voltage to the pitch control means.

57. In a control for a craft operable in space and having yaw control means and roll control means for effecting movement of the craft about its yaw and roll axes respectively, the combination of, a movable member having at least one degree of freedom of movement, electrical circuit means responsive to movement of said movable member in said one degree of freedom for producing a first voltage of transient character and for producing a second voltage delayed in time with respect to said first voltage, circuit connections for applying said first voltage to the roll control means, and circuit connections for applying said second voltage to the yaw control means.

58. In a control for a craft operable in space and having yaw control means, roll control means and pitch control means for effecting movement of the craft about its yaw, roll and pitch axes respectively, the combination of, a movable member having at least one degree of freedom of movement, electrical circuit means responsive to movement of said movable member in said one degree of freedom for producing a first voltage of transient character and for producing a second voltage delayed in time with respect to said first voltage, circuit connections for applying said first voltage to the roll control means, circuit connections for applying said second voltage to the yaw control means, and circuit connections for applying said second voltage to the pitch control means.

59. In a control for an aircraft having aileron control means and rudder control means, the combination of, means for producing a first control quantity for controlling the aileron control means, and a control device responsive to said first control quantity for reducing said first control quantity and simultaneously producing a second control quantity, as the first control quantity is reduced, for controlling the rudder control means.

60. In a control for an aircraft having aileron control means and elevator control means, the combination of, means for producing a first control quantity for controlling the aileron control means, and a control device responsive to said first control quantity for reducing said first control quantity and simultaneously producing a second control quantity, as the first control quantity is reduced, for controlling the elevator control means.

61. In a control for an aircraft having aileron control means, rudder control means and elevator control means, the combination of, means for producing a first control quantity for controlling the aileron control means, and a control device responsive to said first control quantity for reducing said first control quantity and simultaneously producing a second control quantity, as said first control quantity is reduced, for controlling said rudder control means and said elevator control means.

62. In an automatic pilot having a gyroscope for controlling the elevators of an aircraft and during turns effected by which the aircraft tends to adopt an increasingly nose down attitude, a control system comprising means for precessing the gyroscope in such sense as to thereby apply up elevator adjustment, a movable flight controller, and time delay means actuated by said flight controller, said time delay means being connected with said precessing means to effect delayed operation thereof in response to movement of said flight controller.

63. In an automatic pilot having a gyroscope for controlling the elevators of an aircraft and during turns effected by which the aircraft tends to adopt an increasingly nose down attitude, a control system comprising means for precessing the gyroscope in such sense as to thereby apply up elevator adjustment, a movable flight controller, control means actuated by movement of the flight controller for controlling the precessing means, and time delay means forming a part of said control means for delaying response of said precessing means to movement of said flight controller.

CLINTON R. HANNA.
KIRK A. OPLINGER.

References Cited in the file of this patent

UNITED STATES PATENTS

| Number | Name | Date |
|---|---|---|
| 2,066,194 | Bates | Dec. 29, 1936 |
| 2,263,497 | Harrison | Nov. 18, 1941 |
| 2,277,653 | Evans | Mar. 24, 1942 |
| 2,313,503 | Baldwin | Mar. 9, 1943 |
| 2,371,388 | Glenny | Mar. 13, 1945 |
| 2,385,203 | Hanna et al. | Sept. 18, 1945 |
| 2,415,430 | Frische et al. | Feb. 11, 1947 |
| 2,429,257 | Bond | Oct. 21, 1947 |
| 2,471,821 | Kutzler et al. | May 31, 1949 |
| 2,498,064 | Borell | Feb. 21, 1950 |
| 2,561,873 | Kutzler | July 24, 1951 |

OTHER REFERENCES

"Electronics" of October 1944, pages 110 to 117, inclusive.